（12）United States Patent
Ban et al.

(10) Patent No.: US 9,228,381 B2
(45) Date of Patent: Jan. 5, 2016

(54) LID LOCK APPARATUS FOR VEHICLE

(75) Inventors: Hiroshi Ban, Kariya (JP); Takumi Niwa, Kariya (JP); Toshihiro Kitamura, Okazaki (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 754 days.

(21) Appl. No.: 13/431,578

(22) Filed: Mar. 27, 2012

(65) Prior Publication Data

US 2012/0248792 A1 Oct. 4, 2012

(30) Foreign Application Priority Data

Mar. 30, 2011 (JP) .................................. 2011-076316
Oct. 31, 2011 (JP) .................................. 2011-239751

(51) Int. Cl.
*E05C 1/06* (2006.01)
*E05B 83/34* (2014.01)
(Continued)

(52) U.S. Cl.
CPC ................ *E05B 83/34* (2013.01); *B60K 15/05* (2013.01); *E05B 81/18* (2013.01); *E05B 81/90* (2013.01);
(Continued)

(58) Field of Classification Search
CPC .......... B60K 15/05; B60K 2015/0576; B60K 2015/0584; E05B 81/90; E05B 83/34; E05B 81/18; E05B 81/06; E05B 81/25; E05B 81/36; Y10T 292/1021
USPC ............ 292/144, 169.11, 137, 161, 201, 138, 292/142, 145, DIG. 11, DIG. 53, DIG. 54, 292/DIG. 62, DIG. 64, DIG. 65; 296/97.22
See application file for complete search history.

(56) References Cited

U.S. PATENT DOCUMENTS 3,894,377 A * 7/1975 Welch ........................... 52/584.1
4,762,349 A * 8/1988 Ikeda .............................. 292/216
(Continued)

FOREIGN PATENT DOCUMENTS

CN 101830166 A * 9/2010
DE 10 2008 057 860 A1 7/2010
(Continued)

OTHER PUBLICATIONS

Office Action issued on Dec. 9, 2014, by the Japan Patent Office in corresponding Japanese Patent Application No. 2011-239751, and an English Translation of the Office Action. (3 pages).
(Continued)

*Primary Examiner* — Kristina Fulton
*Assistant Examiner* — Christine M Mills
(74) *Attorney, Agent, or Firm* — Buchanan Ingersoll & Rooney PC

(57) ABSTRACT

A lid lock apparatus for a vehicle includes a driving motor, a moving member causing a lid member provided at a vehicle body to be inhibited from opening in a state where the moving member projects from the housing to engage with the lid member, the moving member being retracted into the housing by the driving motor to release the engagement between the moving member and the lid member, and a pulling member connected to the moving member and pulled in a case where the moving member is inhibited from moving by the driving motor to cause the moving member to be retracted into the housing and to release the engagement between the moving member and the lid member. The moving member is movable relative to the pulling member in a moving direction of the moving member in a case where the pulling member is inhibited from operating.

10 Claims, 13 Drawing Sheets

(51) Int. Cl.
  *B60K 15/05*   (2006.01)
  *E05B 81/90*   (2014.01)
  *E05B 81/18*   (2014.01)
  *E05B 81/06*   (2014.01)
  *E05B 81/24*   (2014.01)
  *E05B 81/36*   (2014.01)

(52) U.S. Cl.
  CPC . *B60K 2015/0576* (2013.01); *B60K 2015/0584* (2013.01); *E05B 81/06* (2013.01); *E05B 81/25* (2013.01); *E05B 81/36* (2013.01); *Y10T 292/1021* (2015.04)

(56) References Cited

U.S. PATENT DOCUMENTS

| | | | |
|---|---|---|---|
| 4,839,620 A | | 6/1989 | Yagi |
| 5,080,421 A | * | 1/1992 | Otowa et al. ............... 296/97.22 |
| 5,222,774 A | * | 6/1993 | Fukumoto et al. ........... 292/144 |
| 5,236,233 A | * | 8/1993 | Fukumoto et al. ........... 292/144 |
| 6,053,542 A | * | 4/2000 | Ostrowski et al. ........... 292/201 |
| 6,135,514 A | * | 10/2000 | Kowalewski et al. ......... 292/216 |
| 6,234,556 B1 | * | 5/2001 | Janssen ...................... 296/97.22 |
| 6,247,732 B1 | * | 6/2001 | Alton ........................... 292/216 |
| 6,369,395 B1 | * | 4/2002 | Roessler ..................... 250/462.1 |
| 6,543,833 B2 | * | 4/2003 | Hagano et al. .............. 296/97.22 |
| 8,061,742 B2 | * | 11/2011 | Machida et al. .............. 292/201 |
| 8,141,736 B2 | * | 3/2012 | Takahashi et al. ............ 220/375 |
| 8,333,414 B2 | * | 12/2012 | Takayanagi et al. .......... 292/201 |
| 8,556,327 B1 | * | 10/2013 | Higgins ..................... 296/97.22 |
| 8,622,442 B2 | * | 1/2014 | Imatomi et al. ............... 292/143 |
| 8,677,690 B2 | * | 3/2014 | Lee et al. ........................ 49/325 |
| 8,807,603 B2 | * | 8/2014 | Niwa et al. ................... 292/142 |
| 8,870,241 B2 | * | 10/2014 | Lee et al. ...................... 292/144 |
| 2005/0077734 A1 | * | 4/2005 | Lim ............................... 292/216 |
| 2005/0092752 A1 | * | 5/2005 | Hagano et al. ................ 220/375 |
| 2011/0115239 A1 | | 5/2011 | Imatomi et al. |
| 2011/0241360 A1 | * | 10/2011 | Kitamura ...................... 292/201 |
| 2013/0140831 A1 | * | 6/2013 | Kempel et al. ..................... 292/3 |
| 2013/0341938 A1 | * | 12/2013 | Niwa et al. .................... 292/164 |

FOREIGN PATENT DOCUMENTS

| | | | |
|---|---|---|---|
| EP | 2 182 147 A2 | | 5/2010 |
| EP | 2 182 148 A2 | | 5/2010 |
| JP | 53004512 U | * | 6/1976 |
| JP | 63-151777 A | | 6/1988 |
| JP | 6-71815 U | | 10/1994 |
| JP | 11-303484 A | | 11/1999 |
| JP | 2000-064700 A | | 2/2000 |
| JP | 2002-286074 A | | 10/2002 |
| JP | 2008-270100 A | | 11/2008 |
| JP | 2010-106438 A | | 5/2010 |
| JP | 2010-177109 A | | 8/2010 |
| JP | 2011-256528 A | | 12/2011 |
| KR | 1997-0006504 Y1 | | 6/1997 |

OTHER PUBLICATIONS

Japanese Office Action issued Feb. 24, 2015, by the Japan Patent Office, in corresponding Japanese Patent Application No. 2011-239751 with English-language translation of the Japanese Office Action (5 pages).

Office Action issued by the Japan Patent Office on Sep. 1, 2015 in corresponding Japanese Application No. 2011-239751, and English language translation of Office Action (6 pages).

* cited by examiner

F I G. 23
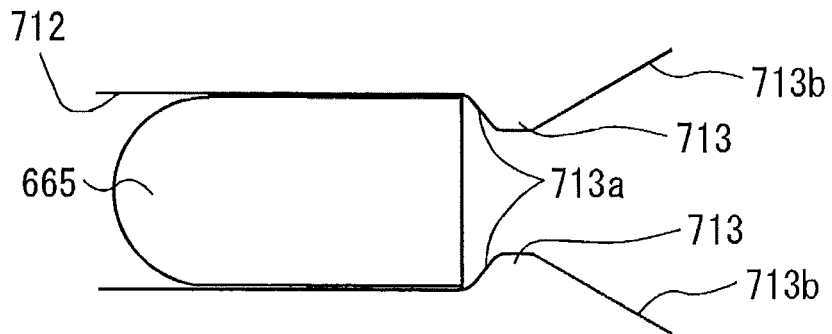
F I G. 24
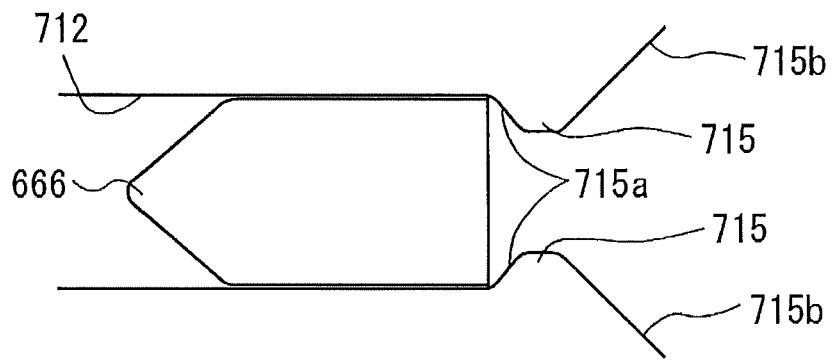
F I G. 25
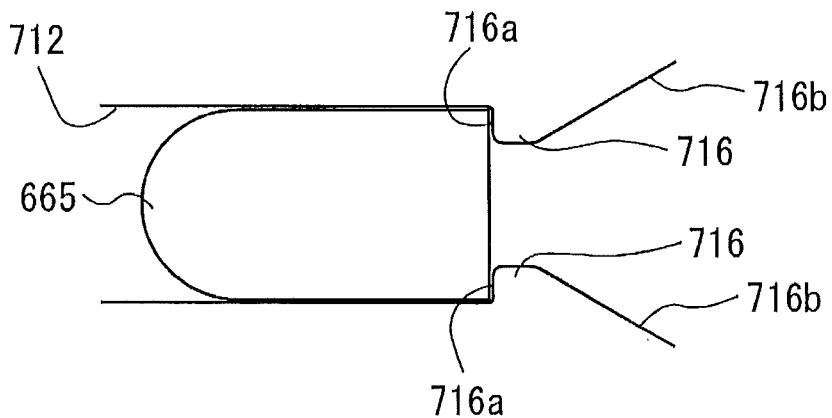

LID LOCK APPARATUS FOR VEHICLE

CROSS REFERENCE TO RELATED APPLICATIONS

This application is based on and claims priority under 35 U.S.C. §119 to Japanese Patent Application 2011-76316, filed on Mar. 30, 2011, and Japanese Patent Application 2011-239751, filed on Oct. 31, 2011, the entire content of which is incorporated herein by reference.

TECHNICAL FIELD

This disclosure generally relates to a lid lock apparatus for a vehicle.

BACKGROUND DISCUSSION

A known lid lock apparatus for a vehicle is disclosed in JP2010-106438A (hereinafter referred to as Reference 1), for example. The lid lock apparatus disclosed in Reference 1 holds a fuel lid (hereinafter referred to as a lid member) for opening and closing a lid box, provided at a vehicle body and accommodating a fuel filler, in a closed state. According to the aforementioned lid lock apparatus, a lock shaft (hereinafter referred to as a moving member) projects towards the lid member so that an end of the moving member engages with the lid member (i.e., the lid lock apparatus is in a locked state). On the other hand, at a time of refueling, a worm wheel is driven by an electric motor so that the moving member, which is in engagement with the worm wheel, moves away from the lid member to thereby disengage the moving member from the lid member (i.e., the lid lock apparatus is in an unlocked state).

According to the lid lock apparatus disclosed in Reference 1, in order to disengage the moving member from the lid member in emergency situations such as a malfunction or breakdown of the electric motor, a pulling member (pulling means) is provided so as to manually pull back the moving member. For example, an operation handle is attached to one end of a string-shaped member to thereby achieve the pulling member. In addition, the other end of the string-shaped member is inserted into a penetration bore formed at an end portion of the moving member so that the string-shaped member is connected to the moving member. The operation handle is attached to a trunk of the vehicle so as to be detached from the trunk in emergency situations and to be held and pulled, thereby pulling back the moving member via the pulling member.

According to the aforementioned lid lock apparatus, each time the worm wheel is driven to rotate by the electric motor, the end of the pulling member connected to the moving member moves in an axial direction of the moving member. Thus, in a case of mounting the pulling member to the vehicle, a mounting space for the constantly moving end of the pulling member should be considered and ensured. This is because a repeated contact of the pulling member relative to the other member at the vehicle (a vehicle body component) may lead to a damage of the pulling member and/or the vehicle body component. Thus, in order to avoid an interference with the other member, the mounting space for the pulling member increases, which may result in a decrease of mountability of the lid lock apparatus at the vehicle.

A need thus exists for a lid lock apparatus for a vehicle which is not susceptible to the drawback mentioned above.

SUMMARY

According to an aspect of this disclosure, a lid lock apparatus for a vehicle includes a driving motor accommodated within a housing, a moving member movably supported within the housing and causing a lid member provided at a vehicle body to be inhibited from opening in a state where a first end of the moving member projects from the housing to engage with the lid member, the moving member being retracted into the housing by an operation of the driving motor to release the engagement between the moving member and the lid member, and a pulling member including a first end portion connected to a second end of the moving member, the pulling member including a second end portion that is pulled in a case where the moving member is inhibited from moving by the driving motor to cause the moving member to be retracted into the housing and to release the engagement between the moving member and the lid member. The moving member is movable relative to the first end portion of the pulling member in a moving direction of the moving member in a case where the pulling member is inhibited from operating.

BRIEF DESCRIPTION OF THE DRAWINGS

The foregoing and additional features and characteristics of this disclosure will become more apparent from the following detailed description considered with the reference to the accompanying drawings, wherein:

FIG. 23 is a diagram of another example of the intermediate portion according to the third embodiment;

FIG. 24 is a diagram of still another example of the intermediate portion and the partition pieces according to the third embodiment; and FIG. 25 is a diagram of the intermediate portion that makes contact with the partition pieces in a direction from the slide bore according to a fourth embodiment.

DETAILED DESCRIPTION

First Embodiment

A lid lock apparatus 1 according to a first embodiment will be explained with reference to FIGS. 1 to 13. A right side in FIG. 2 corresponds to a front side of the lid look apparatus 1 while a left side in FIG. 2 corresponds to a rear side of the lid lock apparatus 1 unless otherwise specified. In addition, an upper side in FIG. 1 corresponds to an upper side of the lid lock apparatus 1 unless otherwise specified.

Figure 1:
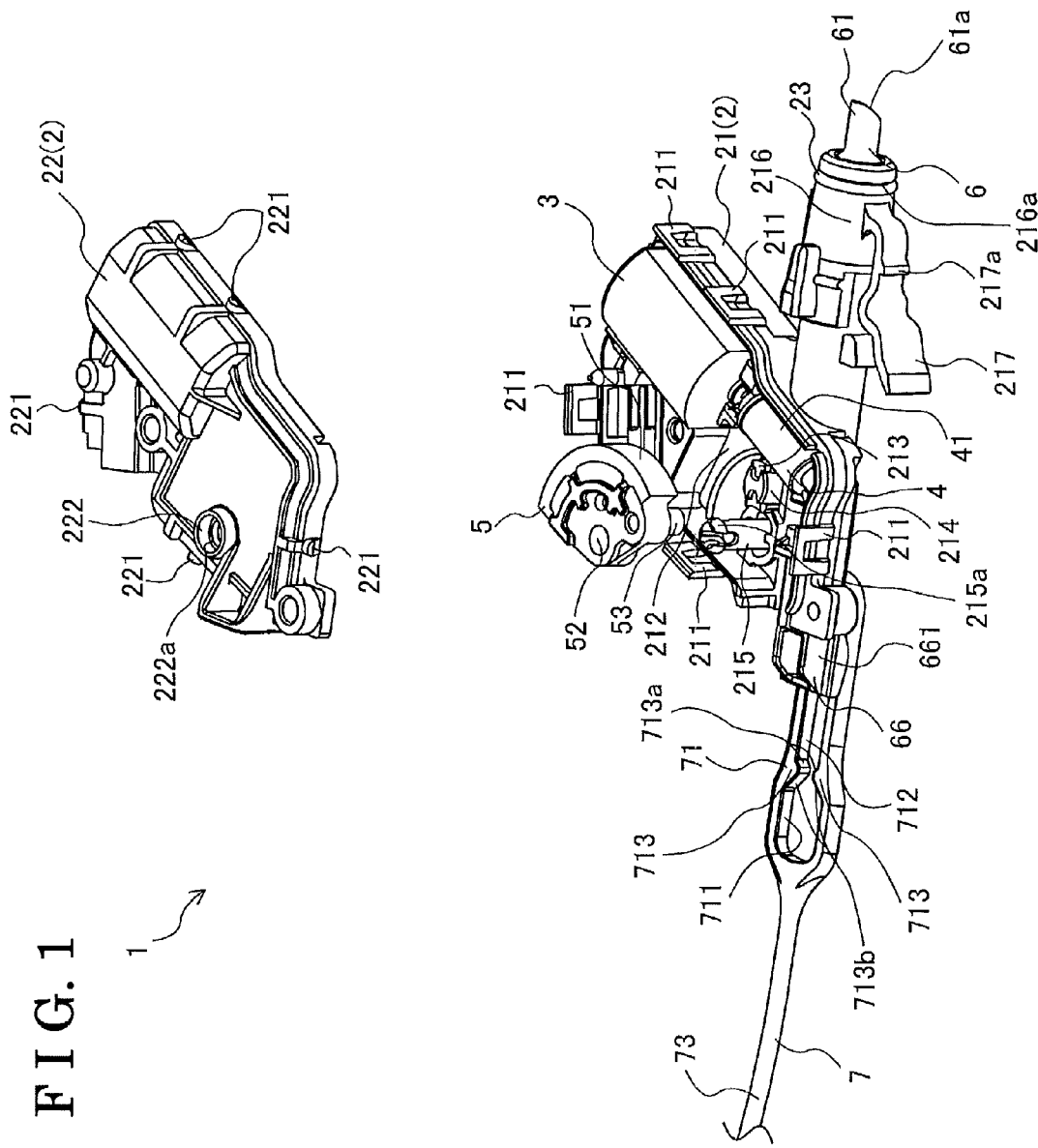
FIG. 1 is an exploded perspective view of a lid lock apparatus for a vehicle according to a first embodiment disclosed here.
Figure 5:
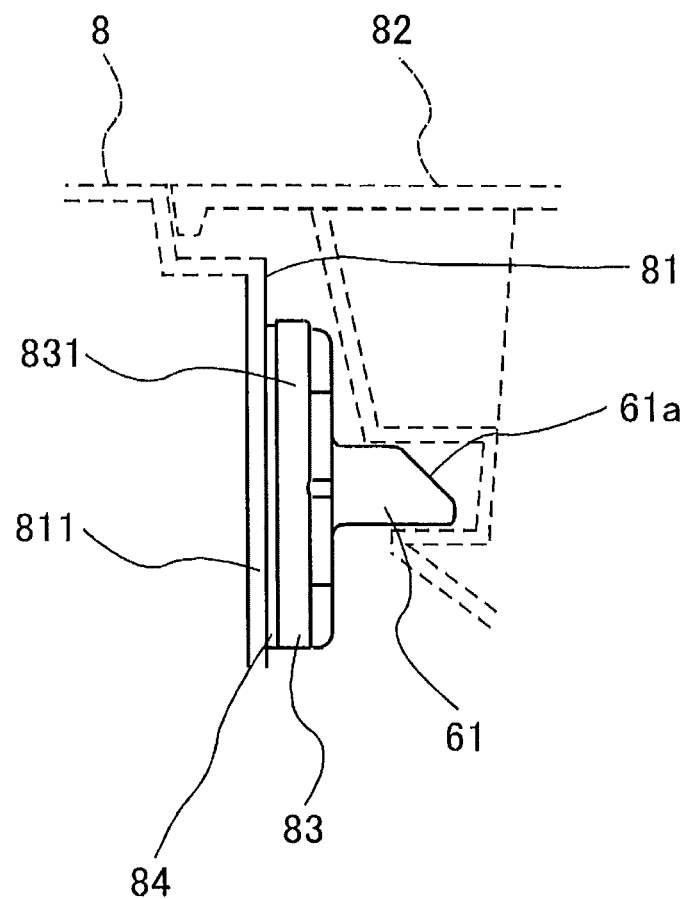
FIG. 5 is a partially enlarged view of a lock shaft of the lid lock apparatus and a lid engaging with each other according to the first embodiment.

As illustrated in FIGS. 1 and 5, the lid lock apparatus 1 serving as a lid lock apparatus for a vehicle is provided at a vehicle body 8 (see FIG. 5). The lid lock apparatus 1 engages with a lid 82 serving as a lid member for opening and closing a lid box 81 that accommodates a fuel filler to thereby inhibit the lid 82 from opening. The lid lock apparatus 1 includes a body 21 and a cover 22 so as to constitute an actuator housing (which will be hereinafter simply referred to as a housing) 2. An electric motor 3 serving as a driving motor, a worm 4, a worm wheel 5, and a lock shaft 6 serving as a moving member are accommodated within the housing 2.

The body 21 and the cover 22 are both made of a synthetic resin material. The body 21 and the cover 22 are fitted to each other after the electric motor 3, the worm 4, the worm wheel 5, and the lock shaft 6 are accommodated in the housing 2. Then, engagement pieces 211 formed at the body 21 engage with engagement projections 221 formed at the cover 22 respectively so that the body 21 and the cover 22 are integrated. A stopper support portion 213 projects from a bottom surface 212 of the body 21 in a state where the stopper support portion 213 is integrally molded with the body 21. A stopper rubber 214 made of a synthetic rubber material is attached to the stopper support portion 213 from the upper side.

An output shaft 31 (see FIG. 2) of the electric motor 3 is press-fitted to the worm 4 so that the worm 4 is rotatable by a driving of the electric motor 3. The worm 4 is made of a metallic material or a synthetic resin material. A tooth portion is formed at an outer peripheral surface 41 of the worm 4. After the output shaft 31 of the electric motor 3 is press-fitted to the worm 4, the electric motor 3 and the worm 4 are mounted at the bottom surface 212 of the body 21.

Figure 2:
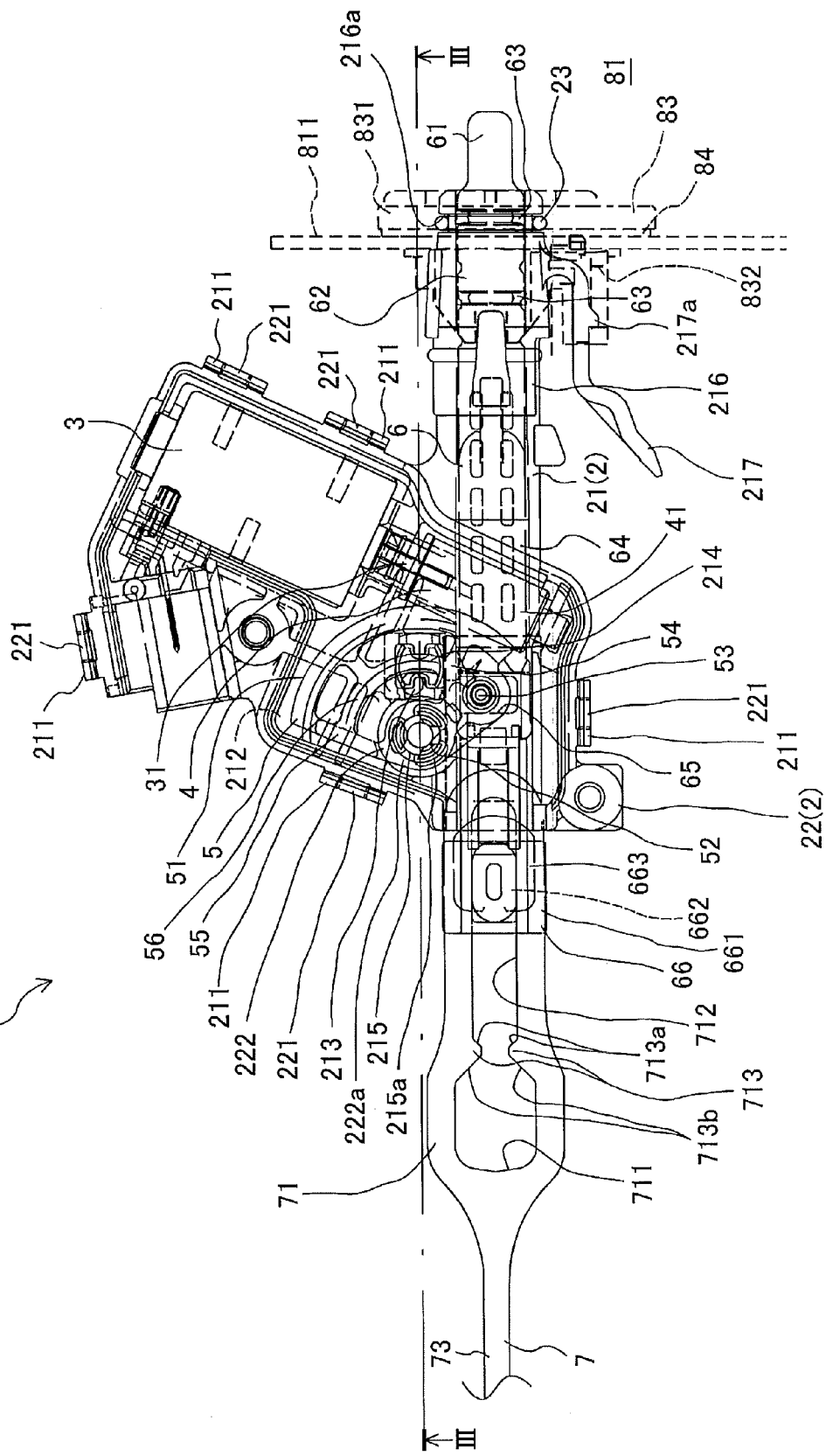
FIG. 2 is a front view of an inside of the lid lock apparatus illustrated in FIG. 1 in a case where the lid lock apparatus is in a locked state.

The worm wheel 5 is made of a synthetic resin material and is substantially formed into a fan shape while an outer peripheral surface 51 has an arc shape. A pivot bore 52 is formed at the worm wheel 5 so as to penetrate in a thickness direction thereof. The worm wheel 5 includes an engagement projection 53 projecting downward in FIG. 1. As illustrated in FIG. 2, a first stopper wall 54 having a flat shape is formed in the vicinity of the engagement projection 53 so as to project downward. In addition, a second stopper wall 55 projecting in the same direction as the direction where the first stopper wall 54 projects is formed in the vicinity of the pivot bore 52. The pivot bore 52 is fitted to a wheel shaft 215 projecting from the bottom surface 212 of the body 21 so that the worm wheel 5 is rotatably attached to the body 21 about the wheel shaft 215. A tooth portion is formed at the outer peripheral surface 51 of the worm wheel 5 so as to be meshed with the tooth portion of the worm 4.

The lock shaft 6 is integrally molded by a synthetic resin material so as to have an elongated shape. The lock shaft 6 includes a lock portion 61 at a first end (i.e., a front end or a right end in FIG. 2) so as to engage with the lid 82. A tapered portion 61a is provided at an end of the lock portion 61 that is formed into a column shape as illustrated in FIG. 5. The lock shaft 6 also includes a support portion 62 adjacent to the lock portion 61. The support portion 62 is formed into a column shape while having a larger diameter than that of the lock portion 61. A pair of seal rings 63 made of a synthetic rubber material is attached to the support portion 62. The support portion 62 of the lock shaft 6 is inserted into a shaft holding portion 216 of the body 21 so as to be axially movable.

As illustrated in FIG. 2, an avoidance portion 64 is formed at a substantially center portion of the lock shaft 6 over a predetermined distance. Because the worm 4 and the worm wheel 5 are provided at an upper side of the avoidance portion 64 in an overlapping manner, the avoidance portion 64 is formed into a shape substantially corresponding to a shape where an upper half of the support portion 62 is cut off in a thickness direction thereof. An interlocking bore 65 is formed in the rear of the avoidance portion 64 so as to be dent in the thickness direction of the lock shaft 6. The engagement projection 53 of the worm wheel 5 is inserted into the interlocking bore 65. According to the aforementioned configuration, the lock shaft 6 is accommodated within the housing 2 so as to be axially movable (in right and left direction in FIG. 2) in a state to engage with the worm wheel 5.

An insertion portion 66 serving as a connecting projection portion is formed at a second end (i.e., a rear end or a left end in FIG. 2) of the lock shaft 6 so as to project in a vertical direction relative to an axial direction of the lock shaft 6. An end portion of an emergency tool 7 serving as a pulling member (which will be explained later) is attached to the insertion portion 66.

After the aforementioned components constituting the lid lock apparatus 1 are accommodated within the body 21, the cover 22 is fitted to the body 21 so that the engagement pieces 211 of the body 21 engage with the engagement projections 221 of the cover 22 to thereby integrate the body 21 and the cover 22. The electric motor 3, the worm 4, the worm wheel 5, and the lock shaft 6 are held without looseness by the body 21 and the cover 22 accordingly. A waterproofing ring 23 made of a synthetic rubber material is attached to a seal groove 216a formed at a front edge of the shaft holding portion 216 of the body 21.

Figure 3:
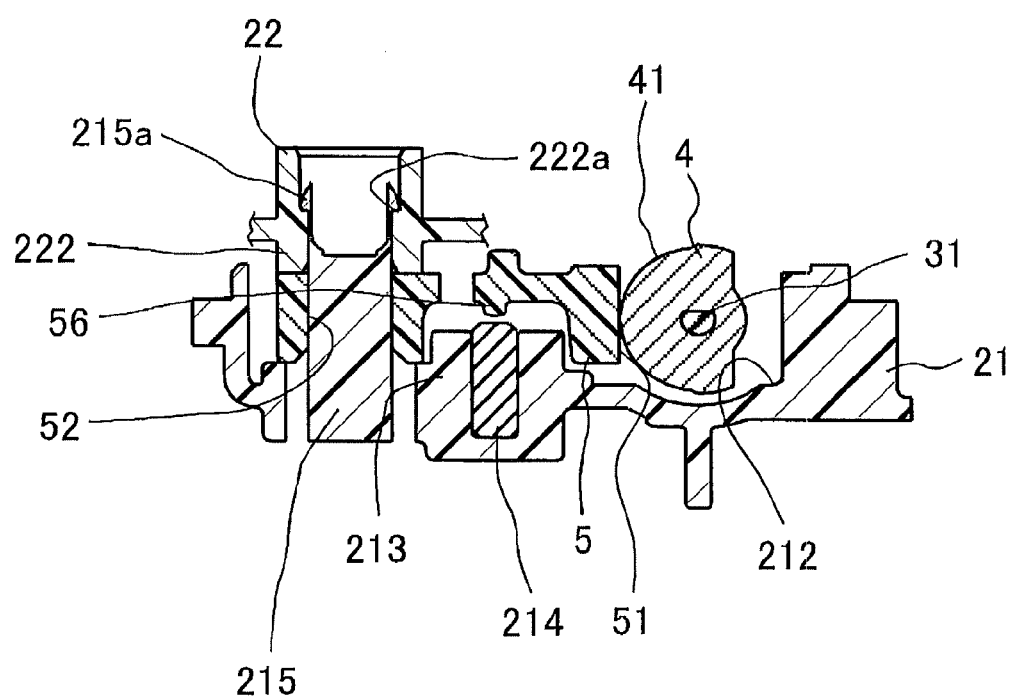
FIG. 3 is a cross-sectional view taken along a line III-III in FIG. 2.

As illustrated in FIG. 3, a stopper retainer 56 faces the stopper rubber 214 so as to inhibit the stopper rubber 214 from disengaging from the stopper support portion 213 in a state where the cover 22 is fitted to the body 21 accommodating the electric motor 3, the worm 4, the worm wheel 5, and the lock shaft 6.

In addition, in a state where the cover 22 is fitted to the body 21, a stepped portion 222a formed at a boss 222 of the cover 22 engages with a hook portion 215a formed at an upper end of the wheel shaft 215 of the body 21. At this time, the worm wheel 5 is sandwiched and held between the bottom surface 212 of the body 21 and a lower surface of the boss 222 of the cover 22. Accordingly, in a case where the first stopper wall 54 or the second stopper wall 55 makes contact with the stopper rubber 214 so that an operation of the electric motor 3 is stopped, which will be explained later, the worm wheel 5 receiving a load in an upper direction from the worm 4 is inhibited from being lifted up from the bottom portion 212.

As illustrated in FIG. 2, the lid lock apparatus 1 is mounted to a support wall 811 of the lid box 81 via a retainer 83. The retainer 83, which does not constitute the lid lock apparatus 1, is attached to the support wall 811 so as to penetrate therethrough. A seal plate 84 is disposed between a large diameter portion 831 of the retainer 83 extending within the lid box 81 (i.e., extending to a right side of the support wall 811 in FIG. 2) and the support wall 811. The seal plate 84 fluid-tightly seals between an inside and an outside of the lid box 81.

The shaft holding portion 216 of the lid lock apparatus 1 is inserted into the retainer 83 so as to be fixed to the support wall 811. The waterproofing ring 23 disposed between the shaft holding portion 216 and the retainer 83 seals between the shaft holding portion 216 and the retainer 83. As illustrated in FIG. 1, an operation lever 217 extends from the shaft holding portion 216 in a rearward direction. An engagement portion 217a projects at a portion of the operation lever 217. In a state where the shaft holding portion 216 is being inserted in a rightward direction in FIG. 2 relative to the retainer 83, the engagement portion 217a makes contact with an inner peripheral surface of the retainer 83, thereby causing the operation lever 217 to be deflected in an upward direction in FIG. 2. When the shaft holding portion 216 is further being inserted, the operation lever 217 returns from the deflected state so as to engage with a recess portion 832 of the retainer 83. As a result, the shaft holding portion 216 is inhibited from disengaging from the retainer 83.

Even when the lock shaft 6 axially moves relative to the housing 2 in a state where the shaft holding portion 216 is attached to the retainer 83, the lid lock apparatus 1 is inhibited from disengaging from the vehicle body 8 because of the engagement between the engagement portion 217a and the recess portion 832. In addition, even when the lock shaft 6 is pulled by the emergency tool 7 in a direction where the engagement between the lock shaft 6 and the lid 82 is released, which will be explained later, the lid lock apparatus 1 is inhibited from disengaging from the vehicle body 8.

On the other hand, in a case of removing the lid lock apparatus 1 from the vehicle body 8, an operator applies a force to the operation lever 217 in the upward direction in FIG. 2. In a state where the engagement between the engagement portion 217a and the recess portion 832 is released, the shaft holding portion 216 is pulled in a leftward direction in FIG. 2 to thereby easily remove the shaft holding portion 216 from the retainer 83.

Figure 4:
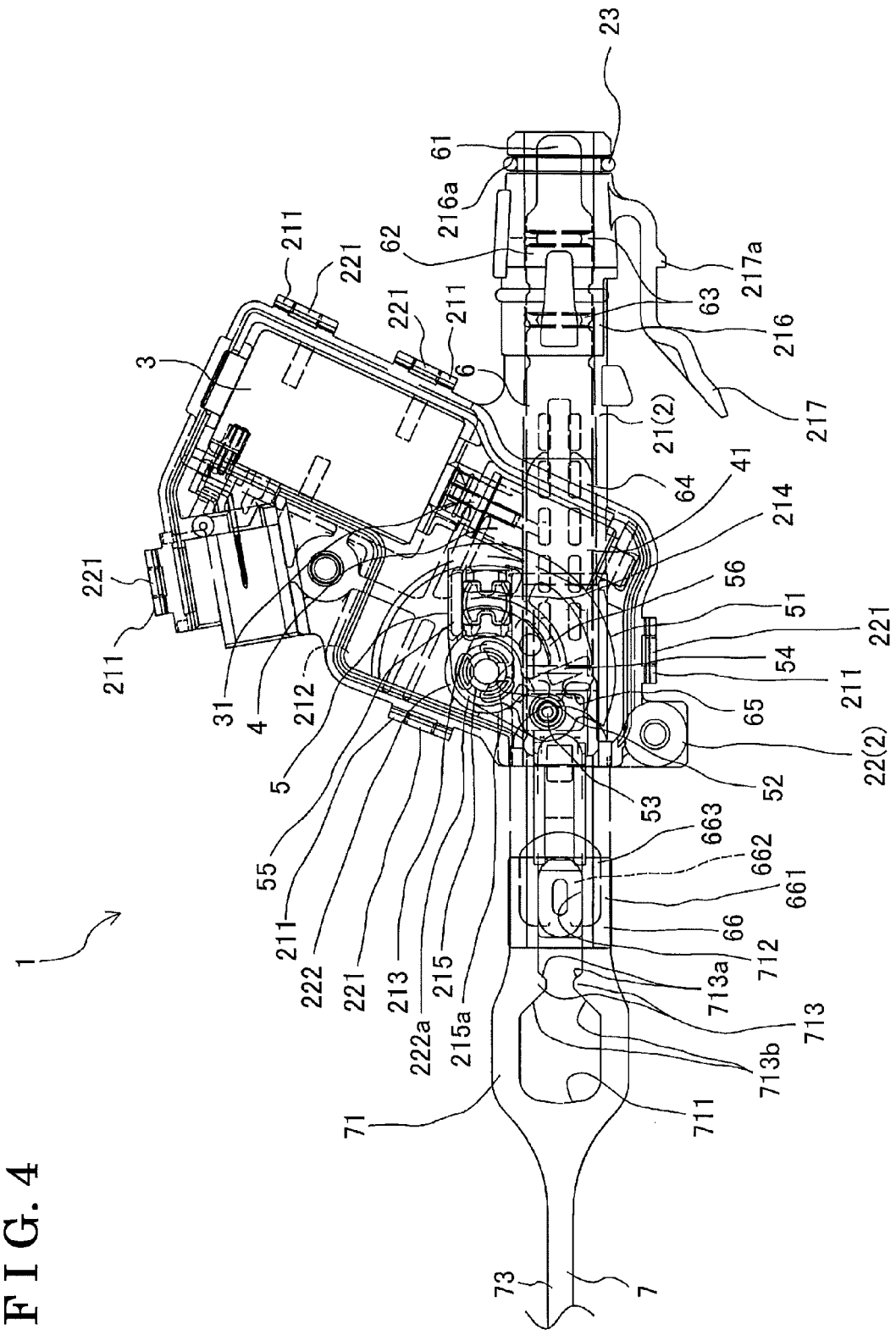
FIG. 4 is a front view of the inside of the lid lock apparatus in a case where the lid lock apparatus is in an unlocked state according to the first embodiment.

The electric motor 3 is operated in a predetermined operation condition in a case where the lock shaft 6 disengages from the lid 82, i.e., the lock shaft 6 (the lid lock apparatus 1) is in an unlocked position as illustrated in FIG. 4. Then, the worm wheel 5 rotates in a counterclockwise direction in FIG. 4 relative to the wheel shaft 215 via the worm 4. The lock shaft 6 that engages with the worm wheel 5 via the engagement projection 53 of the worm wheel 5 and the interlocking bore 65 of the lock shaft 6 axially moves, specifically, moves in the rightward direction in FIG. 4 relative to the housing 2. As a result, the lock portion 61 of the lock shaft 6 projects to the outside of the housing 2 as illustrated in FIG. 2. That is, the lock shaft 6 (the lid lock apparatus 1) is in a locked position. At this time, the lock portion 61 projects within the lid box 81 to engage with the lid 82 so that the lid 82 is held in a state where the lid 82 is inhibited from opening as illustrated in FIG. 5. FIG. 5 illustrates a front end portion of the lid lock apparatus 1 when viewed from an upper side in FIG. 2.

The worm wheel 5 rotating by means of the worm 4 (specifically, the worm wheel 5 rotating in a forward direction) is stopped because the first stopper wall 54 makes contact with the stopper rubber 214. A controller connected to the electric motor 3 detects a load current of the electric motor 3 that is generated when the worm wheel 5 is stopped rotating and then stops an electric power supply to the electric motor 3.

Further, the electric motor 3 is operated in the predetermined operation condition so as to rotate the worm wheel 5 in a clockwise direction in FIG. 2 in a state where the lock shaft 6 is in the locked position. As a result, the lock shaft 6 axially moves, specifically, moves in the leftward direction in FIG. 2 relative to the housing 2 so that the lock portion 61 is retracted into (stored within) the housing 2 as illustrated in FIG. 4. In this case, the engagement between the lock portion 61 and the lid 82 is released to thereby enable the lid 82 to open.

The worm wheel 5 rotating by means of the worm 4 (specifically, the worm wheel 5 rotating in a reverse direction) is stopped because the second stopper wall 55 makes contact with the stopper rubber 214. The controller detects the load current of the electric motor 3 that is generated when the worm wheel 5 is stopped rotating and then stops the electric power supply to the electric motor 3.

Figure 6:
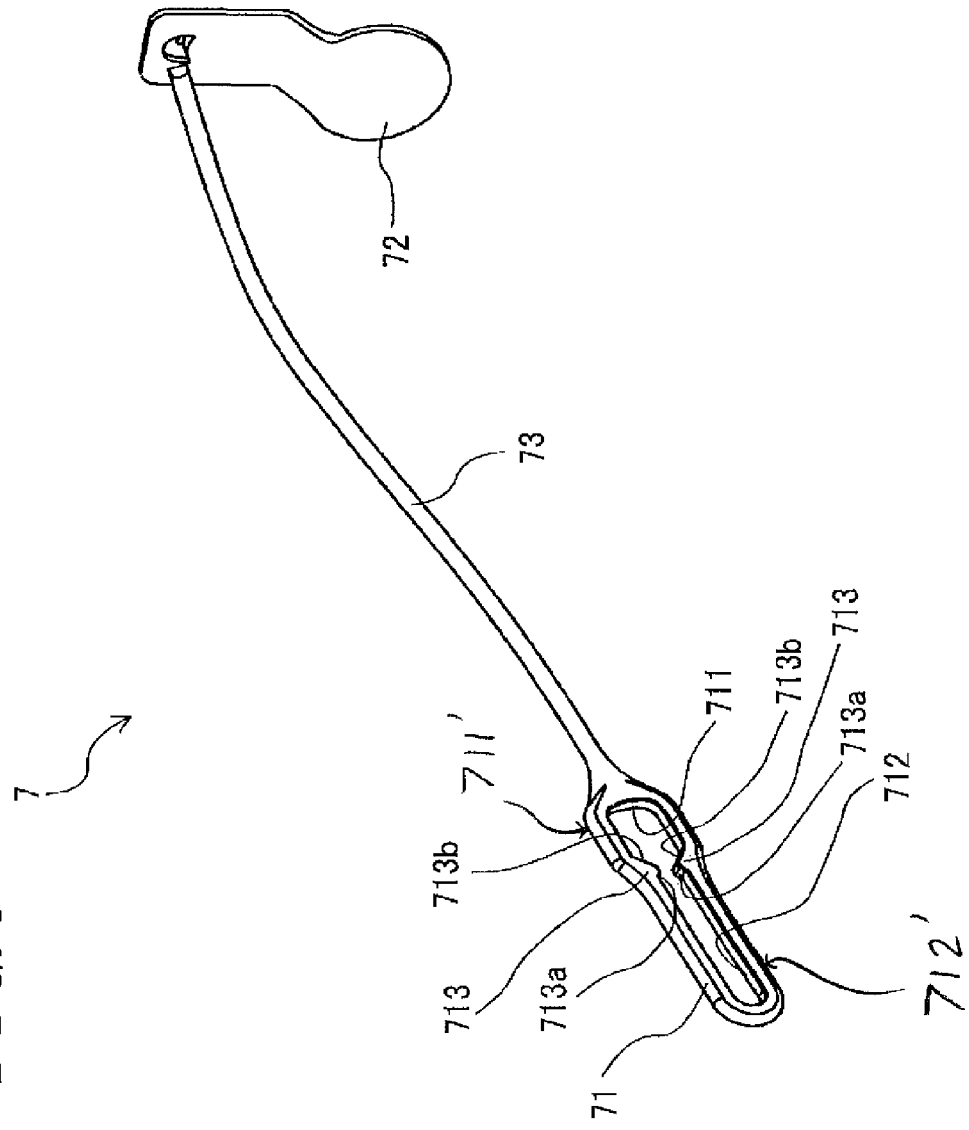
FIG. 6 is an overall view of an emergency tool of the lid lock apparatus illustrated in FIG. 1.

Next, details of the emergency tool 7 will be explained. As illustrated in FIG. 6, the emergency tool 7 includes a shaft engagement portion 71 provided at a first end portion (a front end) and serving as an engagement portion, a handle portion 72 provided at a second end portion (a rear end), and a connection portion 73. The shaft engagement portion 71 is attached to the insertion portion 66 of the lock shaft 6. The handle portion 72 is grasped or held by the hand of an operator in emergency situations. The connection portion 73 connects the shaft engagement portion 71 and the handle portion 72. The emergency tool 7 is integrally molded by a softer synthetic resin material than the synthetic resin material forming the lock shaft 6. The shaft engagement portion 71, the handle portion 72, and the connection portion 73 are integrally molded by the synthetic resin material.

The shaft engagement portion 71 is substantially formed into a flat plate shape. An assembly bore 711 penetrates through the shaft engagement portion 71 in a thickness direction (i.e., a direction perpendicular to the moving direction of the lock shaft 6 in a state where the emergency tool 7 is assembled on the lock shaft 6), at an assembly portion 711' of the shaft engagement portion 71. In addition, a slide bore 712 connected to the assembly bore 711 and serving as a slit is formed at the shaft engagement portion 71 so as to extend to an edge of the emergency tool 7, at a slit portion 712' of the shaft engagement portion 71. The slide bore 712 includes a width smaller than an inner diameter of the assembly bore 711 and extends in the moving direction of the lock shaft 6.

Figure 7:
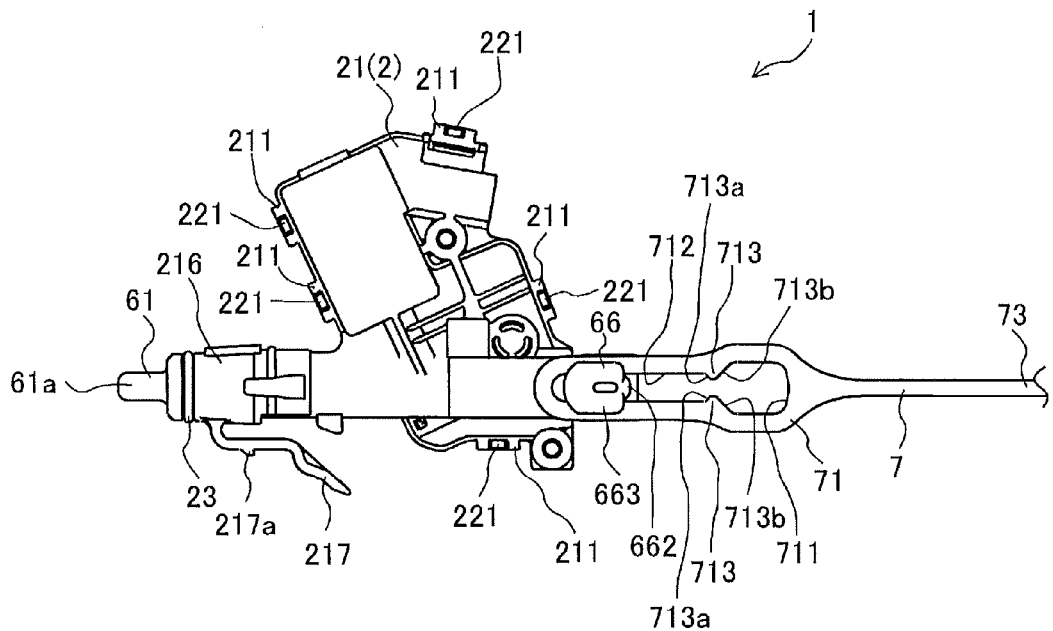
FIG. 7 is a front view of the lid lock apparatus in a state where the emergency tool is connected to the lock shaft according to the first embodiment.

As illustrated in FIG. 7, a pair of partition pieces 713 is provided between the assembly bore 711 and the slide bore 712 so as to face and extend in a direction where the width of the slide bore 712 is reduced. Front walls 713a are formed at end portions (front end portions) of the respective partition pieces 713 facing the slide bore 712 so as to incline towards the assembly bore 711, thereby decreasing the width of the slide bore 712 towards the assembly bore 711. In addition, rear walls 713b are formed at end portions (rear end portions) of the respective partition pieces 713 facing the assembly bore 711 so as to incline towards the slide bore 712, thereby decreasing a width of the assembly bore 711 towards the slide bore 712. Each of the rear walls 713b inclines gentler than each of the front walls 713a as illustrated in FIG. 7. The partition pieces 713 each forms a snap-fit member being deflectable in a direction where the width of the slide bore 712 is enlarged.

Figure 9:
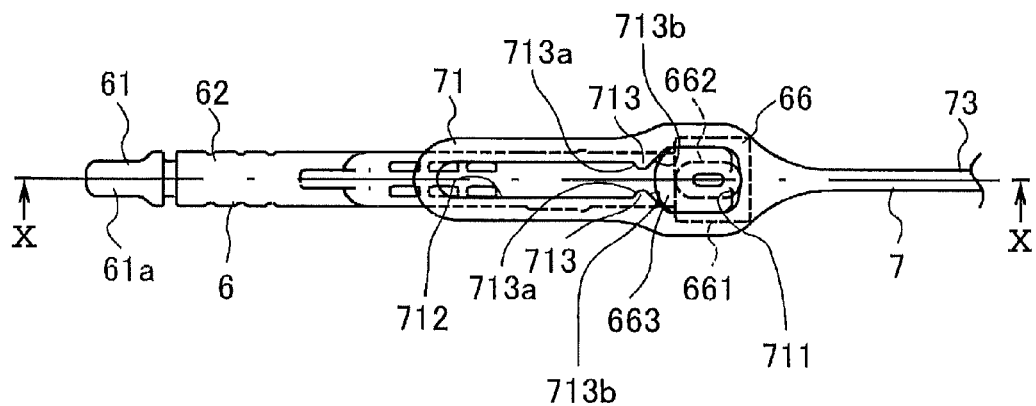
FIG. 9 is a front view of the lock shaft and the emergency tool in a state where an insertion portion of the lock shaft is inserted into an assembly bore of the emergency tool according to the first embodiment.
Figure 10:
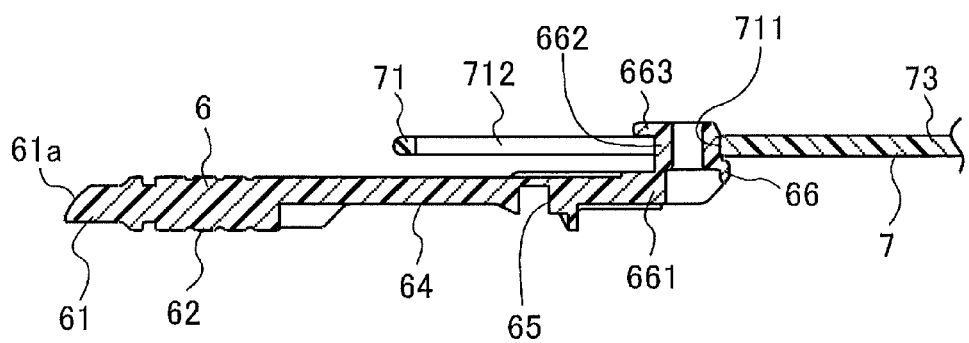
FIG. 10 is a cross-sectional view taken along a line X-X in FIG. 9.

As illustrated in FIGS. 9 and 10, the insertion portion 66 formed at the second end (the rear end) of the lock shaft 6 includes a base portion 661, an intermediate portion 662, and a stopper portion 663. The base portion 661 is integrally connected to a rear end of the avoidance portion 64. The intermediate portion 662 projects from the base portion 661 in a direction perpendicular to the axial direction of the lock shaft 6. The stopper portion 663 is connected to one side of the intermediate portion 662 opposite from the other side thereof where the base portion 661 is connected.

The base portion 661 is substantially formed into a rectangular shape in a cross section perpendicular to a projecting direction of the insertion portion 66 as illustrated in FIG. 9. An outer diameter of the base portion 661 in the cross section is defined so that the base portion 661 is inhibited from penetrating through the assembly bore 711 or the slide bore 712 of the emergency tool 7. In addition, an outer diameter of the stopper portion 663 in a cross section perpendicular to the projecting direction of the insertion portion 66 is defined so that the stopper portion 663 is insertable into the assembly bore 711. On the other hand, a length in a width direction (i.e., a vertical length in FIG. 9) of the stopper portion 663 in the cross section is greater than the width of the slide bore 712 so that the stopper portion 663 is inhibited from penetrating through the slide bore 712.

An outer diameter of the intermediate portion 662 in a cross section perpendicular to the projecting direction of the insertion portion 66 is defined to be smaller than the outer diameter of the stopper portion 663. The intermediate portion 662 is formed into an oval shape (an elongated shape) in the cross section. A length of a short side (i.e., a vertical length in FIG. 9) of the oval shape of the intermediate portion 662 is substantially the same as the width of the slide bore 712 so that the intermediate portion 662 may be accommodated within the slide bore 712.

Figure 8:
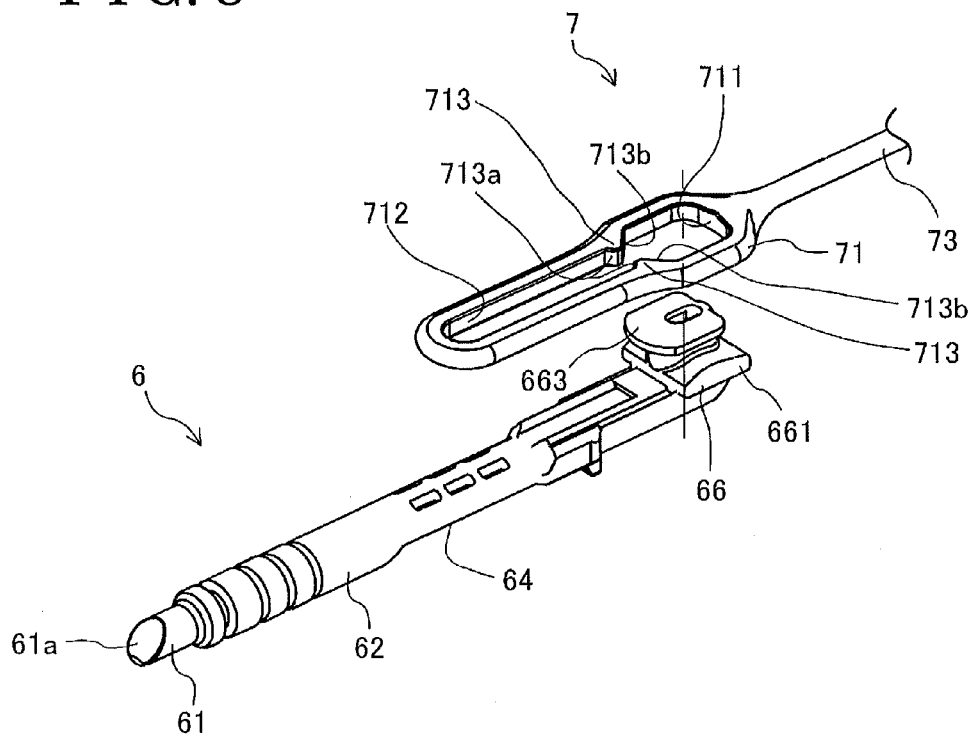
FIG. 8 is a partially perspective view of the lock shaft and the emergency tool in a state before the emergency tool is attached to the lock shaft according to the first embodiment.
Figure 11:
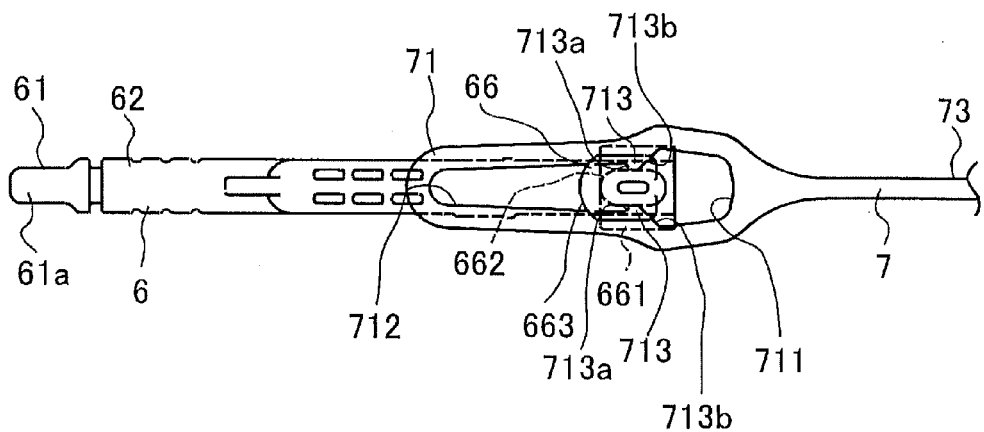
FIG. 11 is a front view of the lock shaft and the emergency tool in a state where the insertion portion moves from the assembly bore to a slide bore of the emergency tool according to the first embodiment.

A connection of the emergency tool 7 relative to the lock shaft 6 will be explained below. As illustrated in FIG. 8, first, the insertion portion 66 of the lock shaft 6 is being inserted into the assembly bore 711 of the emergency tool 7 in the projecting direction of the insertion portion 66 (i.e., from the lower side in FIG. 8). At this time, in a case where the stopper portion 663 of the insertion portion 66 passes through the assembly bore 711 as illustrated in FIGS. 9 and 10 (i.e., the intermediate portion 662 is positioned to mach the assembly bore 711 in a substantially horizontal direction), the emergency tool 7 is pulled in the rearward direction (in the rightward direction in FIG. 9) so that the intermediate portion 662 presses the partition pieces 713 in the forward direction. Because the inclination of each of the rear walls 713b of the respective partition pieces 713 is gentle as mentioned above, the intermediate portion 662 moves against the rear walls 713b so that the partition pieces 713 are deflected in a direction where the width of the slide bore 712 increases as illustrated in FIG. 11 when the emergency tool 7 is pulled by a relatively small load. By the pulling of the emergency tool 7 as mentioned above, the insertion portion 66 moves into the slide bore 712 while pressing and causing the partition pieces 713 to be deflected so as to complete the connection between the emergency tool 7 and the lock shaft 6 as illustrated in FIG. 12.

Figure 12:
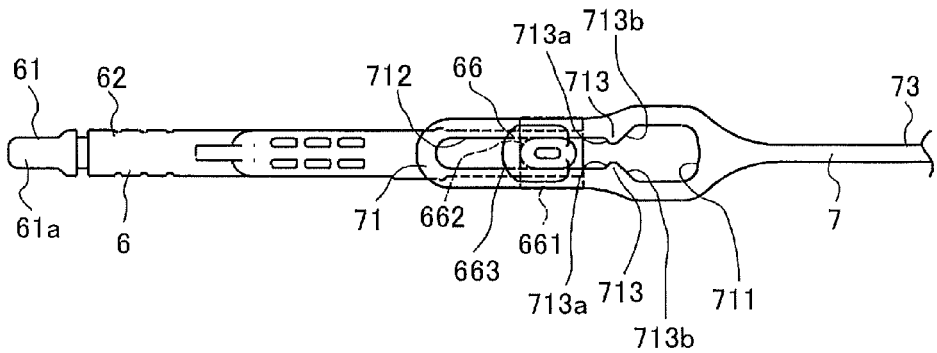
FIG. 12 is a front view of the lock shaft and the emergency tool in a state where the insertion portion engages with the slide bore according to the first embodiment.
Figure 13:
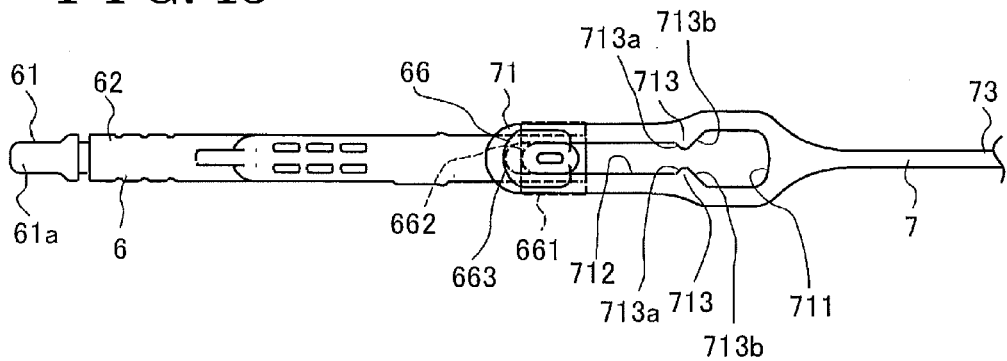
FIG. 13 is a front view of the lock shaft and the emergency tool in a state where the lock shaft moves forward after the lock shaft and the emergency tool are connected to each other according to the first embodiment.

After the connection between the emergency tool 7 and the lock shaft 6 is completed, the intermediate portion 662 of the insertion portion 66 is fitted within the slide bore 712 of the emergency tool 7 so as to be movable in the forward and rearward direction (in the right and left direction in FIG. 12). Thus, in a case where the emergency tool 7 is not operated, the lock shaft 6 is axially movable relative to the shaft engagement portion 71 while the emergency tool 7 remains stationary as illustrated in FIG. 13. In a state where the intermediate portion 662 engages with the slide bore 712, the shaft engagement portion 71 having the plate shape is held and sandwiched between the base portion 661 and the stopper portion 663. Therefore, the shaft engagement portion 71 is inhibited from moving in the thickness direction (i.e., the vertical direction in FIG. 10) relative to the insertion portion 66.

As mentioned above, the cross section of the intermediate portion 662 is formed into the oval shape. An outer peripheral surface in a longitudinal direction of the intermediate portion 662 in the cross section is in contact with the slide bore 712 as illustrated in FIG. 12. Thus, in a state where the insertion portion 66 moves relative to the shaft engagement portion 71 in the forward and rearward direction, the slide bore 712 is inhibited from inclining relative to the intermediate portion 662. The emergency tool 7 is thus inhibited from moving in the width direction (i.e., in the vertical direction in FIG. 13) of the slide bore 712.

As mentioned above, the base portion 661 and the stopper portion 663 of the insertion portion 66 are formed so as not to penetrate through the slide bore 712. Thus, the insertion portion 66 is inhibited from being removed or pulled out in the vertical direction relative to the axial direction of the lock shaft 6. The insertion portion 66 is inhibited from disengaging from the slide bore 712 accordingly.

Because the front walls 713a of the partition pieces 713 incline steeper than the rear walls 713b, the intermediate portion 662 is less likely to move against the front walls 713a even in a case where the front walls 713a are pressed by the intermediate portion 662. That is, a resistance to press the front walls 713a by the insertion portion 66 so that the insertion portion 66 moves from the slide bore 712 to the assembly bore 711 is greater than a resistance to press the rear walls 713b by the insertion portion 66 so that the insertion portion 66 moves from the assembly bore 711 to the slide bore 712. The partition pieces 713 are less likely to be deflected in a direction to increase the width of the slide bore 712 when the insertion portion 66 moves from the slide bore 712 to the assembly bore 711. Thus, the insertion portion 66 positioned in the slide bore 712 is less likely to return to the assembly bore 711 while moving relative to the shaft engagement portion 71.

As illustrated in FIG. 6, the handle portion 72 is formed into a flat plate shape that is partially bent. The handle portion 72 is attached to an attachment wall of the vehicle body 8 at a rear surface side in FIG. 6. The attachment wall of the vehicle body 8 may be formed by an inner panel that constitutes a trunk of the vehicle, for example. The connection portion 73 connecting the shaft engagement portion 71 and the handle portion 72 is arranged by passing between the inner panel and an outer panel of the vehicle body 8. The connection portion 73 includes a predetermined strength against a pulling load by an operator.

In a case where the lid lock apparatus 1 malfunctions so that the lock shaft 6 is inhibited from returning to the unlocked position by the electric motor 3, the operator grasps or holds the handle portion 72 to pull the emergency tool 7 rearward. Then, the insertion portion 66 relatively moves within the slide bore 712 so that a front end of the slide bore 712 makes contact with the intermediate portion 662. The lock shaft 6 may be pulled by the emergency tool 7 accordingly.

Thereafter, when the operator pulls the handle portion 72, the lock shaft 6 moves to the unlocked position while the worm wheel 5, the worm 4, and the electric motor 3 are rotating, thereby releasing the engagement between the lock shaft 6 and the lid 82. The lid 82 is biased in a direction to close the lid box 81 by means of a spring so that the lock shaft 6 does not need to move to the locked position again after refueling.

According to the aforementioned embodiment, in a state where the emergency tool 7 is not operated, the lock shaft 6 is movable relative to the shaft engagement portion 71 of the emergency tool 7 in the axial direction while the emergency tool 7 remains stationary. Thus, when the lock shaft 6 is driven to move by the electric motor 3 in a normal state of the lid lock apparatus 1, the emergency tool 7 is inhibited from moving to thereby reduce a mounting space of the emergency tool 7 at the vehicle, which results in an increased mountability of the lid lock apparatus 1 at the vehicle.

In addition, the emergency tool 7 is integrally formed from the synthetic resin material to thereby decrease a number of components. The emergency tool 7 that is easily manufactured at a low cost is obtained. In addition, the slide bore 712 is formed at the shaft engagement portion 71 so as to extend in the moving direction of the lock shaft 6 while the insertion portion 66 is formed at the lock shaft 6 so as to be movably connected relative to the slide bore 712. As a result, a simple structure by the insertion portion 66 and the slide bore 712 achieves the movement of the lock shaft 6 relative to the emergency tool 7.

In order to connect the lock shaft 6 to the emergency tool 7, the insertion portion 66 is inserted into the assembly bore 711 in the projecting direction of the insertion portion 66 until the stopper portion 663 passes through the assembly bore 711. Then, the insertion portion 66 is moved in the axial direction of the lock shaft 6 so that the intermediate portion 662 engages with the slide bore 712 while being movable in the axial direction of the lock shaft 6.

By the pulling of the emergency tool 7 in the rearward direction after the insertion portion 66 is inserted into the assembly bore 711, the lock shaft 6 and the emergency tool 7 are connected to each other. Thus, an operation to assemble the lock shaft 6 and the emergency tool 7 is easily performed. In addition, after the lock shaft 6 and the emergency tool 7 are connected, the insertion portion 66 is less likely to be removed in the direction perpendicular to the axial direction of the lock shaft 6. The connection between the lock shaft 6 and the emergency tool 7 is less likely to be released to thereby achieve a secure operation of the emergency tool 7 in emergency situations.

The pair of partition pieces 713 is formed between the assembly bore 711 and the slide bore 712 so as to extend in the direction to reduce the width of the slide bore 712. After the insertion portion 66 is inserted into the assembly bore 711, the insertion portion 66 then moves into the slide bore 712 while pressing the partition pieces 713 to be deflected. As a result, the insertion portion 66 is easily brought from a state to be inserted into the assembly bore 711 to a state to engage with the slide bore 712. In addition, after the insertion portion 66 is inserted into the assembly bore 711, the insertion portion 66 moves into the slide bore 712 while causing the partition pieces 713 to be deflected. Thus, the movement of the insertion portion 66 from the assembly bore 711 to the slide bare 712 is moderately conducted to thereby easily confirm that the insertion portion 66 moves so as to be positioned at the slide bore 712.

Further, the rear walls 713b incline gentler than the front walls 713a. Thus, the resistance to press the front walls 713a by the insertion portion 66 so that the insertion portion 66 moves from the slide bore 712 to the assembly bore 711 is greater than the resistance to press the rear walls 713b by the insertion portion 66 so that the insertion portion 66 moves from the assembly bore 711 to the slide bore 712. The partition pieces 713 are less likely to be deflected in the direction to increase the width of the slide bore 712 when the insertion portion 66 moves from the slide bore 712 to the assembly bore 711.

Accordingly, even when the insertion portion 66 makes contact with an end portion (specifically, a rear end) of the slide bore 712 because the emergency tool 7 is pressed against the lock shaft 6 once after the lock shaft 6 and the emergency tool 7 are connected, the insertion portion 66 is less likely to move back to the assembly bore 711. The connection between the emergency tool 7 and the lock shaft 6 is inhibited from being released by the simple structure. In addition, the insertion portion 66 returns from the slide bore 712 to the assembly bore 711 by an intentional application of a large load to the insertion portion 66. Thus, in a case of a repair of the lid lock apparatus 1, for example, the connection between the lock shaft 6 and the emergency tool 7 is released to thereby remove the lid lock apparatus 1 itself or the emergency tool 7 from the vehicle.

Second Embodiment

Figure 18:
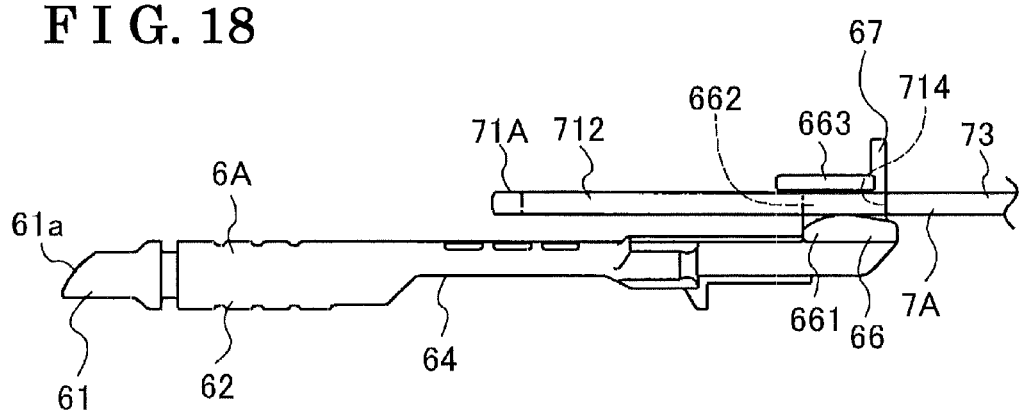
FIG. 18 is a side view of the lock shaft and the emergency tool illustrated in FIG. 17.
Figure 19:
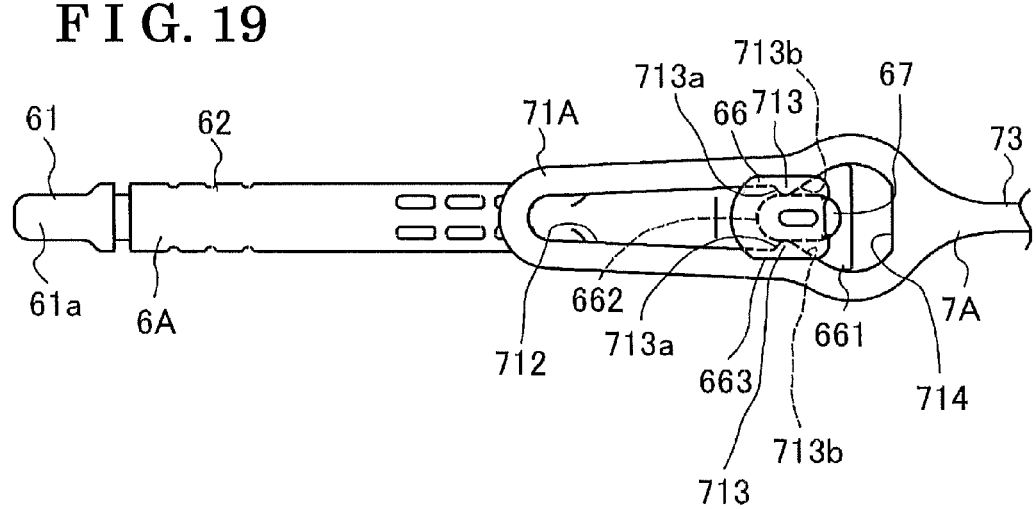
FIG. 19 is a front view of the lock shaft and the emergency tool in a state where the insertion portion moves from the assembly bore to the slide bore according to the second embodiment.
Figure 20:
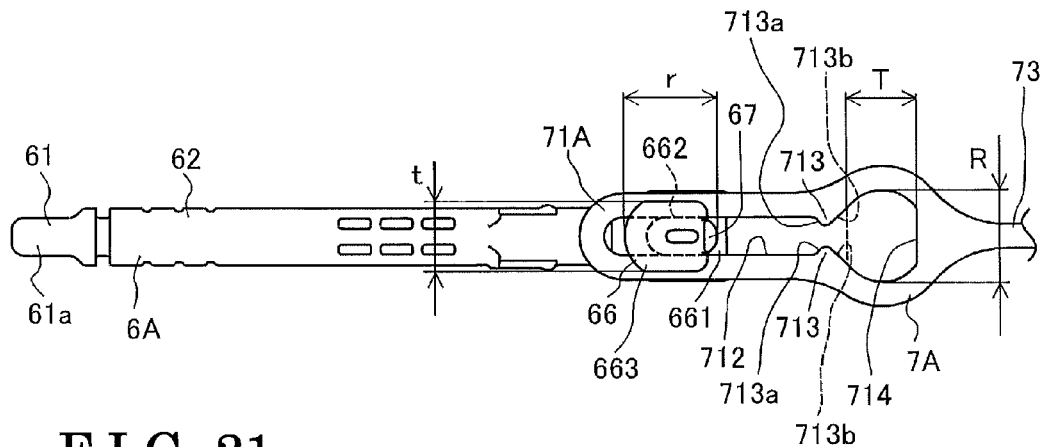
FIG. 20 is a front view of the lock shaft and the emergency tool in a state where the insertion portion engages with the slide bore according to the second embodiment.
Figure 21:
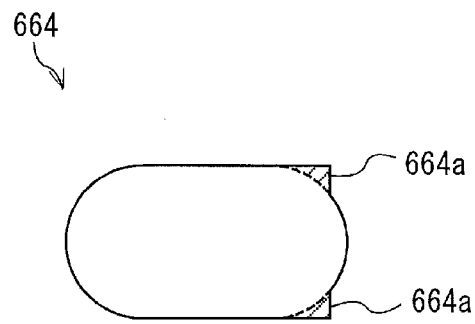
FIG. 21 is a diagram illustrating a cross-sectional shape of an intermediate portion of the lock shaft according to a third embodiment.

A second embodiment will be explained with reference to FIGS. 14 to 20. Configurations of a lock shaft 6A and an emergency tool 7A of the lid lock apparatus 1 and a connection therebetween different from those of the first embodiment will be mainly explained. The lock shaft 6A includes the insertion portion 66 in the same way as the first embodiment. The insertion portion 66 includes the base portion 661, the intermediate portion 662, and the stopper portion 663. The stopper portion 663 in a cross section perpendicular to the projecting direction thereof is formed into an elongated shape. Specifically, as illustrated in FIG. 20, an axial length r of the stopper portion 663 in the axial direction of the lock shaft 6A is larger than a width t of the stopper portion 663. In addition, according to the second embodiment, an engagement piece 67 serving as a stopper piece is formed so as to be positioned at an axial end of the lock shaft 6A. The engagement piece 67 extends from a rear end of the stopper portion 663 so that an extending length of the engagement piece 67 is greater than that of the insertion portion 66 as illustrated in FIG. 14.

A shaft engagement portion 71A of the emergency tool 7A includes an assembly bore 714, the slide bore 712 connected to the assembly bore 714, and the partition pieces 713 arranged between the slide bore 712 and the assembly bore 714 in the same way as the first embodiment. As illustrated in FIG. 20, the assembly bore 714 is formed so that the stopper portion 663 is insertable into the assembly bore 714. An axial length T and a width R of the assemble bore 714 are specified so as to be greater than the width t and the axial length r of the stopper portion 663 respectively (i.e., T>t and R>r). In addition, the assembly bore 714 is formed by an elongated bore where a length in one direction (the width R) of an opening plane is longer than a length in the other direction (the axial length T) of the opening plane. Further, the axial length r of the stopper portion 663 is greater than the axial length T of the assembly bore 714. The other configurations of the lock shaft 6A and the emergency tool 7A are the same as the lock shaft 6 and the emergency tool 7 of the lock shaft 6 and the emergency tool 7 of the first embodiment and thus detailed explanation will be omitted.

Next, the connection of the emergency tool 7A to the lock shaft 6A will be explained. As illustrated in FIG. 15, the insertion portion 66 together with the engagement piece 67 is being inserted into the assembly bore 714 in the projecting direction of the insertion portion 66 (i.e., from the lower side in FIG. 14) in a state where the axial direction of the emergency tool 7A is displaced by 90° relative to the axial direction of the lock shaft 6A. At this time, longitudinal directions of the assembly bore 714 and the stopper portion 663 match each other.

Figure 14:
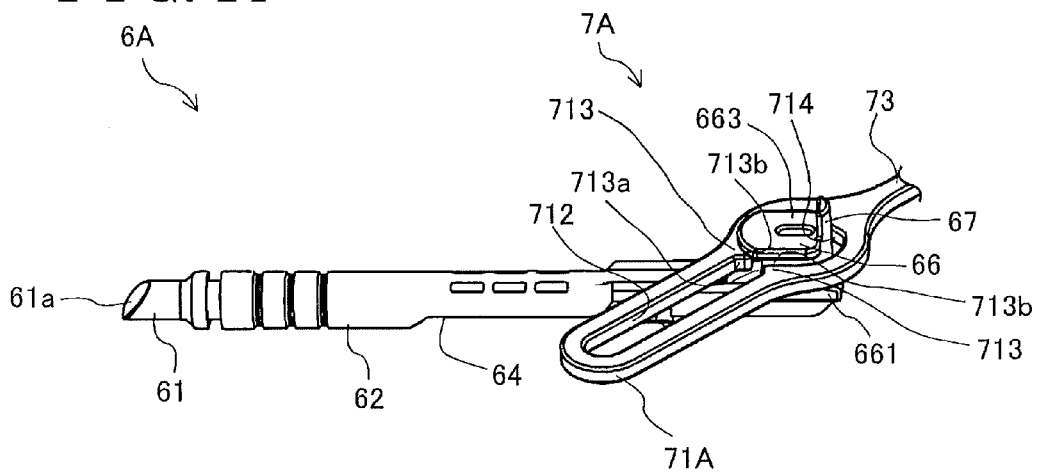
FIG. 14 is a partially perspective view of the lock shaft and the emergency tool illustrating an attachment of the emergency tool to the lock shaft according to a second embodiment.
Figure 15:
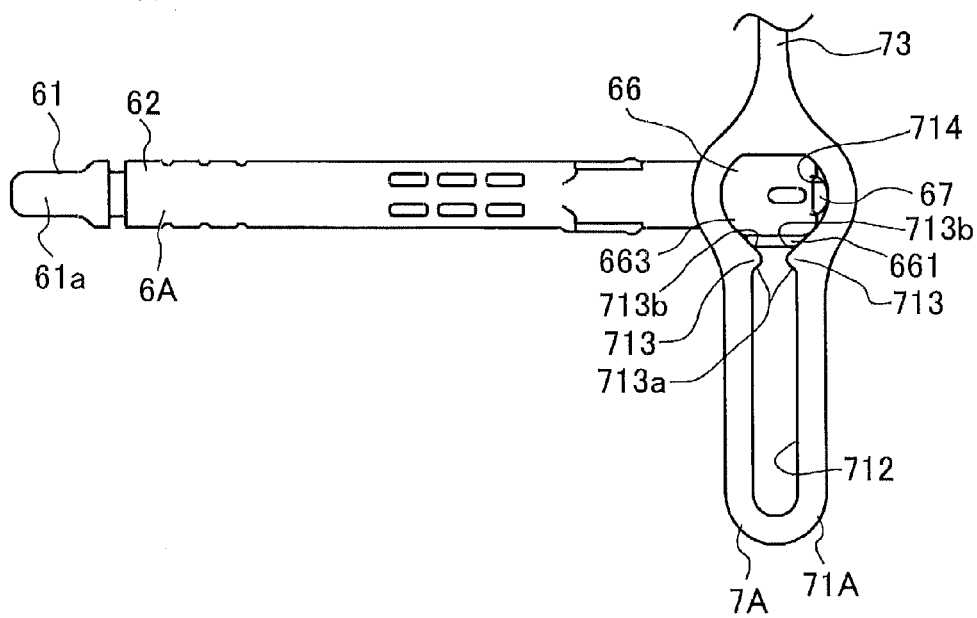
FIG. 15 is a front view of the lock shaft and the emergency tool in a state where the insertion portion illustrated in FIG. 14 is inserted into the assembly bore.
Figure 16:
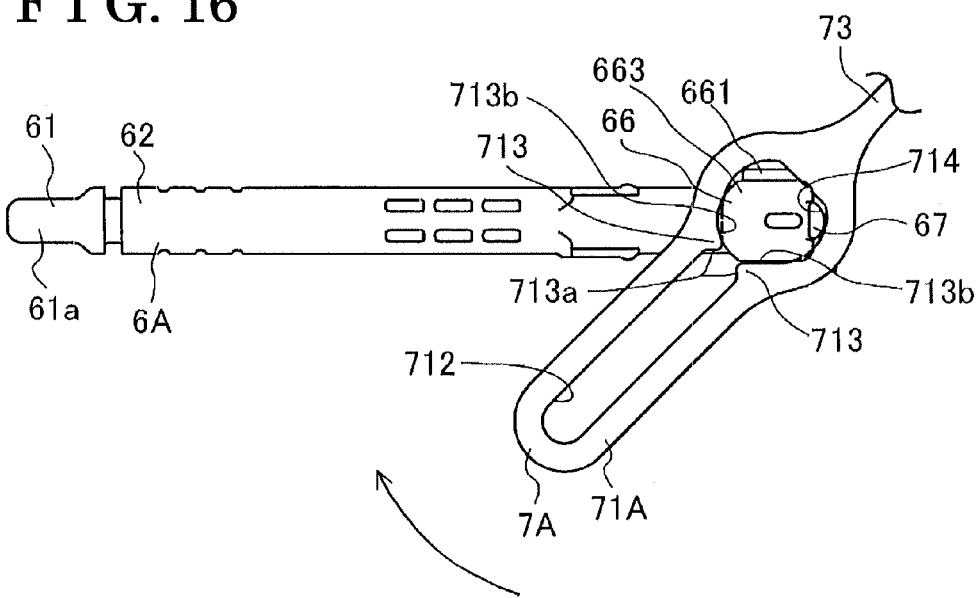
FIG. 16 is a front view of the lock shaft and the emergency tool in a state where the emergency tool is rotated about an axial center of the assembly bore according to the second embodiment.
Figure 17:
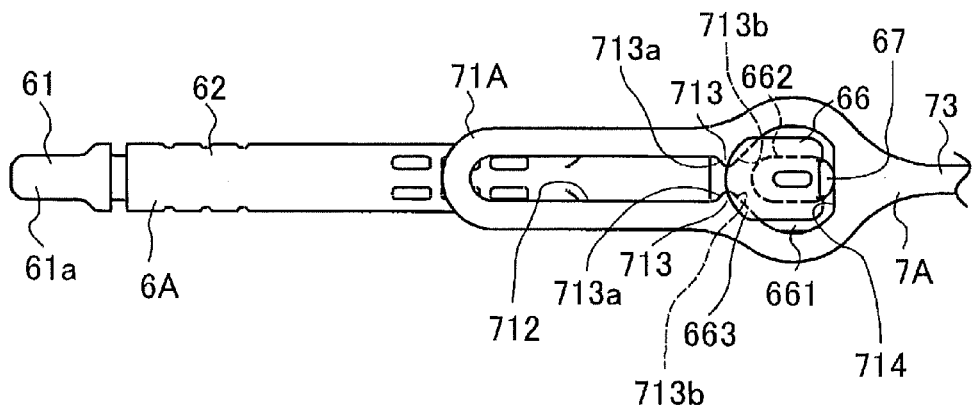
FIG. 17 is a front view of the lock shaft and the emergency tool in a state where the insertion portion is inhibited from being pulled out from the assembly bore according to the second embodiment.

When the stopper portion 663 of the insertion portion 66 passes through the assembly bore 714 while the lock shaft 6A is being inserted into the assembly bore 714, the emergency tool 7A is rotated in a clockwise direction relative to an axial center of the assembly bore 714 as illustrated in FIGS. 14 and 16. In a case where the emergency tool 7A is rotated by 90° so that the axial direction of the lock shaft 6A matches the axial direction of the emergency tool 7A as illustrated in FIGS. 17 and 18, the insertion portion 66 is inhibited from being pulled out from the assembly bore 714 because the axial length r of the stopper portion 663 is greater than the axial length T of the assembly bore 714. Afterwards, in the same way as the first embodiment, the emergency tool 7A is pulled in the rearward direction as illustrated in FIG. 19 so that the insertion portion 66 moves to the slide bore 712 in a state where the partition pieces 713 are deflected in the direction to increase the width of the slide bore 712 as illustrated in FIG. 20.

According to the aforementioned second embodiment, the assembly bore 714 is formed by the elongated bore and the stopper portion 663 of the insertion portion 66 is formed into the elongated shape in the cross section. In order to connect the lock shaft 6A and the emergency tool 7A to each other, the insertion portion 66 is being inserted into the assembly bore 714 in a state where the longitudinal directions of the assembly bore 714 and the stopper portion 663 match each other. Then, when the stopper portion 663 passes through the assembly bore 714, the insertion portion 66 is rotated relative to the axial center of the assembly bore 714 and thereafter moves to the slide bore 712.

Accordingly, the insertion portion 66 is less likely to be pulled out from the assembly bore 714 after being rotated. Thus, even when the insertion portion 66 returns to the assembly bore 714 after the lock shaft GA and the emergency tool 7A are connected to each other, the insertion portion 66 is less likely to disengage from the assembly bore 714. The connection between the lock shaft 6A and the emergency tool 7A is restrained from being released.

Further, the engagement piece 67 projecting greater than the insertion portion 66 is formed at the axial end portion of the lock shaft 6A. The engagement piece 67 is inserted together with the insertion portion 66 into the assembly bore 714. Thus, even when the shaft engagement portion 71A of the emergency tool 7A inclines relative to the lock shaft 6A in the thickness direction thereof (i.e., in the vertical direction in FIG. 18), a peripheral edge of the assembly bore 714 makes contact with the engagement piece 67, thereby restraining the insertion portion 66 from disengaging from the assembly bore 714.

Third Embodiment

A third embodiment will be explained with reference to FIGS. 21 to 24. An intermediate portion 664 of the lock shaft 6 according to the third embodiment integrally includes a pair of projections 664a (hatched portions in FIG. 21) at a rear end. The other configuration of the intermediate portion 664 is the same as the intermediate portion 662 of the first embodiment. In addition, the other configuration of the third embodiment including the partition pieces 713 engaging with the intermediate portion 664 of the emergency tool 7 as illustrated in FIG. 22 is the same as the first embodiment.

Figure 22:
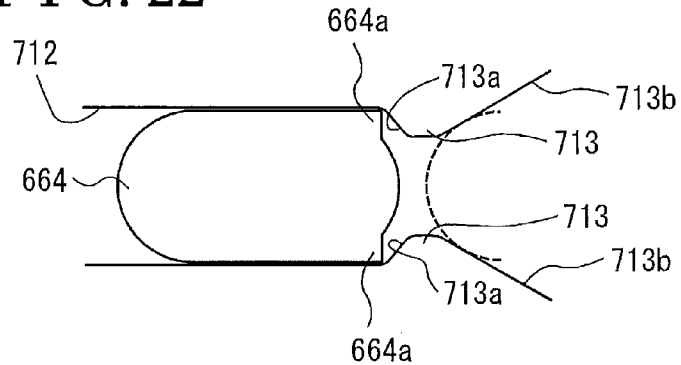
FIG. 22 is a diagram illustrating a state where the intermediate portion illustrated in FIG. 21 makes contact with partition pieces in a direction from the slide bore.

According to the third embodiment, because of the pair of projections 664a, a contact position of the intermediate portion 664 relative to the front walls 713a in a case where the intermediate portion 664 moves from the slide bore 712 to the assembly bore 711 is at a more outer side in the width direction of the slide bore 712 (i.e., upper and lower sides in FIG. 22) as compared to a contact position of the intermediate portion 664 relative to the rear walls 713b (a position of the intermediate portion 664 is shown by a dashed line in FIG. 22) in a case where the intermediate portion 664 moves from the assembly bore 711 to the slide bore 712. That is, in a case where the intermediate portion 664 presses the partition pieces 713 in a direction from the slide bore 712, the intermediate portion 664 makes contact with base portions of the partition pieces 713.

Thus, the resistance to press the front walls 713a by the intermediate portion 664 when the intermediate portion 664 moves from the slide bore 712 to the assembly bore 711 is greater than the resistance to press the rear walls 713b by the intermediate portion 664 when the intermediate portion 664 moves from the assembly bore 711 to the slide bore 712, in addition to a fact that a rigidity of a portion of the front walls 713a pressed by the intermediate portion 664 is large and the front walls 713a incline deeper than the rear walls 713b. Therefore, the partition pieces 713 are less likely to be deflected in the direction to increase the width of the slide bore 712 when the intermediate portion 664 presses the front walls 713a as compared to a case where the intermediate portion 664 presses the rear walls 713b. The insertion portion 66 that moves so as to be positioned in the slide bore 712 is less likely to return to the assembly bore 711 while moving relative to the shaft engagement portion 71.

According to the third embodiment, the pair of projections 664a is integrally formed at the intermediate portion 664 as mentioned above. Therefore, the contact position of the intermediate portion 664 relative to the front walls 713a in a case where the intermediate portion 664 moves from the slide bore 712 to the assembly bore 711 is at the more outer side in the width direction of the slide bore 712 as compared to the contact position of the intermediate portion 664 relative to the rear walls 713b in a case where the intermediate portion 664 moves from the assembly bore 711 to the slide bore 712. The intermediate portion 664, which once moves so as to be positioned in the slide bore 712, is less likely to return to the assembly bore 711. The connection between the lock shaft 6 and the emergency tool 7 is restrained from being released by the aforementioned simple structure. In addition, as illustrated in FIG. 23, an intermediate portion 665 where a rear end portion forms a flat surface may be applied instead of the intermediate portion 664.

Further, as illustrated in FIG. 24, an intermediate portion 666 where a front end portion forms a sharp angle while a rear end portion forms a flat surface may be applied instead of the intermediate portion 664. In this case, front walls 715a and rear walls 715b of partition pieces 715 of the emergency tool 7 engaging with the intermediate portion 666 may incline at the same degrees as each other. According to the intermediate portion 665 illustrated in FIG. 23, a contact position of the intermediate portion 665 relative to the front walls 713a in a case where the intermediate portion 665 moves from the slide bore 712 to the assembly bore 711 is at a more outer side in the width direction of the slide bore 712 as compared to a contact position of the intermediate portion 665 relative to the rear walls 713b in a case where the intermediate portion 665 moves from the assembly bore 711 to the slide bore 712. In the same way, according to the intermediate portion 666 illustrated in FIG. 24, a contact position of the intermediate portion 666 relative to the front walls 715a in a case where the intermediate portion 666 moves from the slide bore 712 to the assembly bore 711 is at a more outer side in the width direction of the slide bore 712 as compared to a contact position of the intermediate portion 666 relative to the rear walls 715b in a case where the intermediate portion 666 moves from the assembly bore 711 to the slide bore 712. Therefore, the partition pieces 713 and 715 are less likely to be deflected in the direction to increase the width of the slide bore 712 when the intermediate portions 665 and 666 press the front walls 713a and 715a as compared to a case where the intermediate portions 665 and 666 press the rear walls 713b and 715b. The insertion portion 66 that moves so as to be positioned in the slide bore 712 is less likely to return to the assembly bore 711 while moving relative to the shaft engagement portion 71.

Fourth Embodiment

A fourth embodiment will be explained with reference to FIG. 25. The intermediate portion 665 illustrated in FIG. 25 is formed in the same way as the intermediate portion 665 illustrated in FIG. 23. A pair of partition pieces 716 according to the fourth embodiment includes rear walls 716b inclining in the same way as the rear walls 713b of the partition pieces 713 of the first embodiment, and front walls 716a vertically formed relative to the moving direction of the intermediate portion 665. The other configurations of the intermediate portion 665 and the partition pieces 716 are the same as the intermediate portion 662 and the partition pieces 713 of the first embodiment. As mentioned above, the front walls 716a are formed to be vertical relative to the moving direction of the intermediate portion 665. Thus, even when the intermediate portion 665 presses the front walls 716a in a direction from the slide bore 712 towards the assembly bore 711, a load vector applied in a direction to increase the width of the slide bore 712 is zero. Thus, the partition pieces 716 are inhibited from being deflected. At this time, in a case where the intermediate portion 665 presses the rear walls 716b of the partition pieces 716 in a direction from the assembly bore 711, the partition pieces 716 are likely to be deflected in the direction to increase the width of the slide bore 712 in the same way as the first embodiment.

According to the fourth embodiment, the partition pieces 716 are inhibited from being deflected when the intermediate portion 665 presses the partition pieces 716 in the direction from the slide bore 712 to the assembly bore 711. Thus, even when the intermediate portion 665 makes contact with an end of the slide bore 712 (specifically, a right end in FIG. 25) by the emergency tool 7 being pressed towards the lock shaft 6 after the lock shaft 6 and the emergency tool 7 are connected, the intermediate portion 665 is restrained from returning to the assembly bore 711. The connection between the lock shaft 6 and the emergency tool 7 is completely inhibited from being released accordingly. The case where the connection between the lock shaft 6 and the emergency tool 7 is completely inhibited from being released includes a case where the connection between the lock shaft 6 and the emergency tool 7 is released by means of an exclusive tool, for example. That is, the case where the partition pieces 716 are inhibited from being deflected includes not only a case where the partition pieces 716 are completely inhibited from being deflected but also a case where the partition pieces 716 may be deflected so that the connection between the lock shaft 6 and the emergency tool 7 is released when the exclusive tool, for example, is used. The intermediate portions 664, 666, and 666, and the partition pieces 715 and 716 according to the third and fourth embodiments may be applied to the lock shaft 6A and the emergency tool 7A according to the second embodiment.

The first to fourth embodiments are not limited to have the aforementioned configurations and may be appropriately modified or changed. The assembly bore 711 and the slide bore 712 may be formed at a rear end portion of the lock shaft 6 while the insertion portion 66 may be formed at the shaft engagement portion 71 of the emergency tool 7. In addition, only the single partition piece 713 may be formed at the emergency tool 7 or 7A.

According to the emergency tool 7A of the second embodiment, the insertion portion 66 is inhibited from being pulled out from the assembly bore 714 formed by the elongated bore in a state where the emergency tool 7A is connected to the lock shaft 6A. Thus, the partition pieces 713 formed between the assembly bore 714 and the slide bore 712 are not necessarily provided. In addition, the handle portion 72 of the emergency tool 7 is not limited to have the shape according to the aforementioned first to fourth embodiments and may have an appropriate shape so that at least the operator grasps and pulls the handle portion 72.

The aforementioned first to fourth embodiments may be applied to a lid lock apparatus as disclosed in JP04-302680A where a lock shaft that is constantly biased by a spring, for example, in a locked position is driven by an electric motor to move to an unlocked position against a biasing force of the spring.

The retainer 83 and the support wall 811 may be integrally formed by adhesive or welding, for example. Alternatively, the retainer 83 and the support wall 811 may be integrally formed from synthetic resin, for example. In a case where the retainer 83 and the support wall 811 are integrally formed, the seal plate 84 may be eliminated so that the inside and the outside of the lid box 81 is fluid tightly sealed only by the waterproofing ring 23. The power supply to the electric motor 3 may be stopped on a basis of a timer control.

According to the aforementioned first to fourth embodiments, the emergency tool 7, 7A is inhibited from moving even when the lock shaft 6, 6A is driven to move by the electric motor 3 in a normal state of the lid lock apparatus 1.

A mounting space of the emergency tool 7, 7A at the vehicle is reduced to thereby improve the mountability of the lid lock apparatus 1 at the vehicle.

According to the aforementioned first to fourth embodiments, the emergency tool 7, 7A includes the shaft engagement portion 71, 71A attached to the second end of the lock shaft 6, 6A, and the slide bore 712 extending in the moving direction of the lock shaft 6, 6A is formed at one of the shaft engagement portion 71, 71A and the second end of the lock shaft 6, 6A while the insertion portion 66 movably connected to the slide bore 712 is formed at the other of the shaft engagement portion 71, 71A and the second end of the lock shaft 6, 6A.

Accordingly, the movement of the lock shaft 6, 6A relative to the emergency tool 7, 7A is achieved by the simple structure obtained by the insertion portion 66 and the slide bore 712.

According to the aforementioned first to fourth embodiments, the slide bore 712 and the assembly bore 711, 714 are formed at one of the shaft engagement portion 71, 71A and the second end of the lock shaft 6, 6A, the assembly bore 711, 714 which penetrates in the direction perpendicular to the moving direction of the lock shaft 6, 6A and into which the insertion portion 66 is insertable, the slide bore 712 being connected to the assembly bore 711, 714 and extending in the moving direction of the lock shaft 6, 6A while including the width smaller than the inner diameter of the assembly bore 711, 714. The insertion portion 66 includes the base portion 661 integrally formed at one of the shaft engagement portion 71, 71A and the lock shaft 6, 6A, the intermediate portion 662, 664, 665, 666 projecting from the base portion 661 in the direction perpendicular to the moving direction of the lock shaft 6, 6A, and the stopper portion 663 connected to one side of the intermediate portion 662, 664, 665, 666 opposite from the other side of the intermediate portion 662, 664, 665, 666 where the base portion 661 is connected, the outer diameter of the base portion 661 being defined so that the base portion 661 is inhibited from passing through the assembly bore 711, 714, the outer diameter of the stopper portion 663 being defined so that the stopper portion 663 is insertable into the assembly bore 711, 714 and is inhibited from passing through the slide bore 712, the outer diameter of the intermediate portion 662, 664, 665, 666 being defined so that the intermediate portion 662, 664, 665, 666 is accommodated within the slide bore 712. In order to connect the lock shaft 6, 6A and the emergency tool 7, 7A to each other, the insertion portion 66 is inserted into the assembly bore 711, 714 until the stopper portion 663 passes through the assembly bore 711, 714 and is then moved in the moving direction of the lock shaft 6, 6A to cause the intermediate portion 662, 664, 665, 666 to engage with the slide bore 712 in a state where the intermediate portion 662, 664, 665, 666 is movable relative to the slide bore 712 in the moving direction of the lock shaft 6, 6A.

Accordingly, after the insertion portion 66 is inserted into the assembly bore 711, 714, the insertion portion 66 is simply moved into the slide bore 712 to thereby connect the lock shaft 6 and the emergency tool 7 to each other. In addition, after the insertion portion 66 and the emergency tool 7, 7A are connected to each other, the insertion portion 66 is less likely to be pulled out from the slide bore 712 in the direction perpendicular to the moving direction of the lock shaft 6, 6A. The connection between the lock shaft 6, 6A and the emergency tool 7, 7A may be inhibited from being released, which leads to a secure operation of the emergency tool 7, 7A in the emergency situations.

According to the aforementioned first to fourth embodiments, the slide bore 712 and the assembly bore 711, 714 are formed at the shaft engagement portion 71, 71A, the partition pieces 713, 715, 716 being formed between the assembly bore 711, 714 and the slide bore 712 by extending in the direction to reduce the width of the slide bore 712, and the insertion portion 66 after being inserted into the assembly bore 711, 714 moves into the slide bore 712 by pressing the partition pieces 713, 715, 716 so that the partition pieces 713, 715, 716 are deflected in the direction to increase the width of the slide bore 712.

Accordingly, the insertion portion 66 is easily shifted from the state where the insertion portion 66 is inserted into the assembly bore 711, 714 to the state where the insertion portion 66 engages with the slide bore 712. In addition, after the insertion portion 66 is inserted into the assembly bore 711, 714, the insertion portion 66 moves into the slide bore 712 while causing the partition pieces 713, 715, 716 to be deflected. Thus, the movement of the insertion portion 66 from the assembly bore 711, 714 to the slide bore 712 is moderately conducted to thereby easily confirm that the insertion portion 66 moves so as to be positioned at the slide bore 712.

According to the aforementioned first to fourth embodiments, the resistance to move the insertion portion 66 from the slide bore 712 to the assembly bore 711, 714 by pressing the partition pieces 713, 715, 716 is greater than the resistance to move the insertion portion 66 from the assembly bore 711, 714 to the slide bore 712 by pressing the partition pieces 713, 715, 716.

Accordingly, even in a case where the insertion portion 66 makes contact with the end of the slide bore 712 because the emergency tool 7, 7A is pushed towards the lock shaft 6, 6A, for example, after the lock shaft 6, 6A and the emergency tool 7, 7A are connected to each other, the insertion portion 66 is less likely to return to the assembly bore 711, 714. The connection between the lock shaft 6, 6A and the emergency tool 7, 7A is restrained from being released accordingly. Further, the insertion portion 66 returns from the slide bore 712 to the assembly bore 711, 714 by an intentional application of a large load to the insertion portion 66. Thus, in a case of a repair of the lid lock apparatus 1, for example, the connection between the lock shaft 6, 6A and the emergency tool 7, 7A is released to thereby remove the lid lock apparatus 1 itself or the emergency tool 7, 7A from the vehicle.

According to the aforementioned first to fourth embodiments, the rear walls 713b, 715b, 716b are formed at the end portion of the partition pieces 713, 715, 716 facing the assembly bore 711, 714, the rear walls 713b, 715b, 716b being formed to incline in the direction where the width of the assembly bore 711, 714 is reduced towards the slide bore 71. The front walls 713a, 715a, 716a are formed at the end portion of the partition pieces 713, 715, 716 facing the slide bore 712, the front walls 713a, 715a, 716a being formed to incline in the direction where the width of the slide bore 712 is reduced towards the assembly bore 711, 714. The rear walls 713b, 715b, 716b are inclined gentler than the front walls 713a, 715a, 716a.

Accordingly, the insertion portion 66 that once moves to the slide bore 712 is less likely to return to the assembly bore 711, 714. The connection between the lock shaft 6, 6A and the emergency tool 7, 7A is restrained from being released by the simple structure.

According to the aforementioned third and fourth embodiments, the contact position of the insertion portion 66 relative to the partition pieces 713, 715, 716 in a case where the insertion portion 66 presses the partition pieces 713, 715, 716 in a direction from the assembly bore 711 is at a more outer side in the width direction of the slide bore 712 as compared to the contact position of the insertion portion 66 relative to the partition pieces 713, 715, 716 in a case where the insertion portion 66 presses the partition pieces 713, 715, 716 in a direction from the slide bore 712.

Accordingly, the insertion portion 66 that once moves to the slide bore 712 is less likely to return to the assembly bore 711. The connection between the lock shaft 6 and the emergency tool 7 is restrained from being released by the simple structure.

According to the aforementioned fourth embodiment, the partition pieces 716 are inhibited from being deflected in a case where the partition pieces 716 are pressed in a direction from the slide bore 712 towards the assembly bore 711.

Accordingly, even in a case where the insertion portion 66 makes contact with the end of the slide bore 712 because the emergency tool 7 is pushed towards the lock shaft 6, for example, after the lock shaft 6 and the emergency tool 7 are connected to each other, the insertion portion 66 is inhibited from returning to the assembly bore 711. The connection between the lock shaft 6 and the emergency tool 7 is completely inhibited from being released accordingly. The case where the connection between the lock shaft 6 and the emergency tool 7 is completely inhibited from being released includes a case where the connection between the lock shaft 6 and the emergency tool 7 is released by means of an exclusive tool, for example. That is, the case where the partition pieces 716 are inhibited from being deflected includes not only a case where the partition pieces 716 are completely inhibited from being deflected but also a case where the partition pieces 716 may be deflected so that the connection between the lock shaft 6 and the emergency tool 7 is released when the exclusive tool, for example, is used.

According to the aforementioned second embodiment, the assembly bore 714 is formed by the elongated bore where the length in one direction (the width R) of the opening plane is longer than the length in the other direction (the axial length T) of the opening plane, the stopper portion 663 being longer in one direction than the other direction in the cross section so that the stopper portion 663 is insertable into the assembly bore 714. In order to connect the lock shaft 6A and the emergency tool 7A to each other, the insertion portion 66 is inserted into the assembly bore 714 in a state where longitudinal directions of the assembly bore 714 and the stopper portion 663 match each other until the stopper portion 663 passes through the assembly bore 714, and then the insertion portion 66 is rotated about the axial center of the assembly bore 714 to be moved into the slide bore 712.

Accordingly, the insertion portion 66 is less likely to be pulled out from the assembly bore 714 after being rotated. Thus, even when the insertion portion 66 returns to the assembly bore 714 after the lock shaft 6A and the emergency tool 7A are connected to each other, the insertion portion 66 is less likely to disengage from the assembly bore 714. The connection between the lock shaft 6A and the emergency tool 7A is restrained from being released.

According to the aforementioned second embodiment, the stopper piece 67 is formed at one of the shaft engagement portion 71A and the lock shaft 6A to be positioned at the end portion in the moving direction of the lock shaft 6A, the stopper piece 67 projecting greater than the insertion portion 66. The stopper piece 67 is inserted together with the insertion portion 66 into the assembly bore 714.

Accordingly, even when the shaft engagement portion 71A of the emergency tool 7A inclines relative to the lock shaft 6A in the thickness direction thereof, a peripheral edge of the assembly bore 714 makes contact with the engagement piece 67, thereby restraining the insertion portion 66 from disengaging from the assembly bore 714.

According to the aforementioned first to fourth embodiments, the emergency tool 7, 7A includes the shaft engagement portion 71, 71A, the handle portion 72 configured to be grasped by an operator, and the connection portion 73 connecting the shaft engagement portion 71, 71A and the handle portion 72. The shaft engagement portion 71, 71A, the handle portion 72, and the connection portion 73 are integrally formed from a synthetic resin material.

Accordingly, the number of components of the emergency tool 7, 7A is reduced, which results in the emergency tool 7, 7A that is easily manufactured at a low cost.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A lid lock apparatus for a vehicle, comprising:
a driving motor accommodated within a housing;
a moving member movably supported within the housing and causing a lid member provided at a vehicle body to be inhibited from opening in a state where a first end of the moving member projects from the housing to engage with the lid member, the moving member being retracted into the housing by an operation of the driving motor to release the engagement between the moving member and the lid member;
a pulling member including a first end portion connected to a second end of the moving member, the pulling member including a second end portion that is pulled in a case where the moving member is inhibited from moving by the driving motor to cause the moving member to be retracted into the housing and to release the engagement between the moving member and the lid member;
the moving member being movable relative to the first end portion of the pulling member in a moving direction of the moving member in a case where the pulling member is not being operated;
the pulling member including an engagement portion attached to the second end of the moving member;
a slit extending in the moving direction of the moving member and being formed at one of the engagement portion and the second end of the moving member while a connecting projection portion movably connected to the slit is formed at the other of the engagement portion and the second end of the moving member;
the slit and an assembly bore being formed at the one of the engagement portion and the second end of the moving member;
the assembly bore penetrating in a direction perpendicular to the moving direction of the moving member and into which the connecting projection portion is insertable;
the slit being connected to the assembly bore and extending in the moving direction of the moving member while possessing a width smaller than an inner diameter of the assembly bore;
the connecting projection portion including a base portion integrally formed at one of the engagement portion and the moving member, an intermediate portion of the connecting projection portion projecting from the base portion in a direction perpendicular to the moving direction of the moving member, and a stopper portion of the connecting projection portion connected to one side of the intermediate portion opposite from the other side of the intermediate portion where the base portion is connected, an outer diameter of the base portion being defined so that the base portion is inhibited from passing through the assembly bore, an outer diameter of the stopper portion being defined so that the stopper portion is insertable into the assembly bore and is inhibited from passing through the slit, an outer diameter of the intermediate portion being defined so that the intermediate portion is accommodated within the slit;

the moving member and the pulling member being configured to be connectable to each other by inserting the connecting projection portion into the assembly bore until the stopper portion passes through the assembly bore, then moving the connecting projection portion in the moving direction of the moving member to cause the intermediate portion to engage with the slit in a state where the intermediate portion is movable relative to the slit in the moving direction of the moving member, and then moving the connecting projection portion into the slit so that the slit is deflected in a direction to increase the width of the slit;

the assembly bore being formed at an assembly portion of the one of the engagement portion and the second end of the moving member, and the slit being formed at a slit portion of the one of the engagement portion and the second end of the moving member; and a width of the slit portion being smaller than a width of the assembly portion.

2. The lid lock apparatus according to claim 1, wherein the slit and the assembly bore are formed at the engagement portion, a partition piece is formed between the assembly bore and the slit by extending in a direction to reduce the width of the slit, and the moving member and the gulling member are configured so that the connecting projection portion after being inserted into the assembly bore is movable into the slit by pressing the partition piece so that the partition piece is deflected in the direction to increase the width of the slit.

3. The lid lock apparatus according to claim 2, wherein a resistance to move the connecting projection portion from the slit to the assembly bore by pressing the partition piece is greater than a resistance to move the connecting projection portion from the assembly bore to the slit by pressing the partition piece.

4. The lid lock apparatus according to claim 3, wherein a rear wall is formed at an end portion of the partition piece facing the assembly bore, the rear wall being formed to incline in a direction where a width of the assembly bore is reduced towards the slit, and wherein a front wall is formed at an end portion of the partition piece facing the slit, the front wall being formed to incline in a direction where the width of the slit is reduced towards the assembly bore, the rear wall being inclined gentler than the front wall.

5. The lid lock apparatus according to claim 3, wherein a contact position of the connecting projection portion relative to the partition piece in a case where the connecting projection portion presses the partition piece in a direction from the slit is at a more outer side in the width direction of the slit as compared to a contact position of the connecting projection portion relative to the partition piece in a case where the connecting projection portion presses the partition piece in a direction from the assembly bore.

6. The lid lock apparatus according to claim 3, wherein the partition piece is inhibited from being deflected in a case where the partition piece is pressed in a direction from the slit towards the assembly bore.

7. The lid lock apparatus according to claim 1, wherein the assembly bore is formed by an elongated bore where a length in one direction of an opening plane is longer than a length in the other direction of the opening plane, the stopper portion being longer in one direction than the other direction in a cross section so that the stopper portion is insertable into the assembly bore, and wherein in order to connect the moving member and the pulling member to each other, the connecting projection portion is inserted into the assembly bore in a state where longitudinal directions of the assembly bore and the stopper portion match each other until the stopper portion passes through the assembly bore, and then the connecting projection portion is rotated about an axial center of the assembly bore to be moved into the slit.

8. The lid lock apparatus according to claim 1, wherein a stopper piece is formed at one of the engagement portion and the moving member to be positioned at an end portion in the moving direction of the moving member, the stopper piece projecting greater than the connecting projection portion, and wherein the stopper piece is inserted together with the connecting projection portion into the assembly bore.

9. The lid lock apparatus according to claim 1, wherein the pulling member includes the engagement portion, a handle portion configured to be grasped by an operator, and a connection portion connecting the engagement portion and the handle portion, and wherein the engagement portion, the handle portion, and the connection portion are integrally formed from a synthetic resin material.

10. The lid lock apparatus according to claim 1, wherein the width of the assembly portion reduces gradually toward the slit portion.

* * * * *